United States Patent
Odajima et al.

(12) 
(10) Patent No.: US 12,319,821 B2
(45) Date of Patent: Jun. 3, 2025

(54) AQUEOUS PIGMENT DISPERSION

(71) Applicants: SANYO CHEMICAL INDUSTRIES, LTD., Kyoto (JP); SEIKO EPSON CORPORATION, Tokyo (JP)

(72) Inventors: Hiroshi Odajima, Kyoto (JP); Takeshi Yano, Suwa-Gun Fujimi-Machi (JP); Kenji Kitada, Shiojiri (JP); Shinichi Naito, Chino (JP)

(73) Assignees: SANYO CHEMICAL INDUSTRIES, LTD., Kyoto (JP); SEIKO EPSON CORPORATION, Tokyo (JP)

(*) Notice: Subject to any disclaimer, the term of this patent is extended or adjusted under 35 U.S.C. 154(b) by 180 days.

(21) Appl. No.: 18/127,794

(22) Filed: Mar. 29, 2023

(65) Prior Publication Data

US 2023/0312961 A1 Oct. 5, 2023

(30) Foreign Application Priority Data

Mar. 31, 2022 (JP) ................................ 2022-059137

(51) Int. Cl.
*B41J 2/01* (2006.01)
*C09D 11/326* (2014.01)
*C09D 175/08* (2006.01)

(52) U.S. Cl.
CPC .......... *C09D 11/326* (2013.01); *C09D 175/08* (2013.01)

(58) Field of Classification Search
CPC ..... B41J 2/01; B41J 2/21; B41J 2/2107; B41J 2/211; B41J 2/2114; B41J 2/2117; B41J 2/5052; B41M 1/18; B41M 1/20; B41M 1/22; B41M 1/24; B41M 1/26; C09D 11/326; C09D 175/08; C08G 18/12; C08G 18/3206; C08G 18/3234; C08G 18/0823; C08G 18/0852; C08G 18/0866; C08G 18/348; C08G 18/44; C08G 18/664; C08G 18/6651; C08G 18/6659; C08G 18/724; C08G 18/758; C08G 18/755

See application file for complete search history.

(56) References Cited

FOREIGN PATENT DOCUMENTS

| JP | 2017-114991 |   | 6/2017  |              |
|----|-------------|---|---------|--------------|
| JP | 2018-154829 |   | 10/2018 |              |
| JP | 2019006936 A | * | 1/2019  | ............ C08G 18/00 |
| JP | 2021075680  | * | 5/2021  | ............ C09D 175/04 |
| JP | 2022146196  | * | 10/2022 | ................ B41J 2/01 |
| JP | 2023004876  | * | 1/2023  | ............ C09D 11/30 |

* cited by examiner

*Primary Examiner* — Kristal Feggins
(74) *Attorney, Agent, or Firm* — Wenderoth, Lind & Ponack, L.L.P.

(57) ABSTRACT

Provided is an aqueous pigment dispersion having high initial dispersibility, high storage stability, and high color developability after printing, and particularly having high rub resistance (rubbing fastness) in cotton fabrics. An aqueous pigment dispersion for an aqueous inkjet ink, including a pigment and an aqueous medium, the pigment being dispersed with a polyurethane resin prepared by reacting an active hydrogen atom-containing component (A) with an organic polyisocyanate component (B), the active hydrogen atom-containing component (A) containing a polycarbonate polyol (a1), the organic polyisocyanate component (B) containing at least one compounds selected from the group consisting of aliphatic polyisocyanates (b1), alicyclic polyisocyanates (b2), and aromatic polyisocyanates (b3), wherein a coating film formed by drying the aqueous pigment dispersion at 50° C. for 12 hours has a storage modulus G' at 160° C. of 1 to 10 MPa.

4 Claims, No Drawings

AQUEOUS PIGMENT DISPERSION

TECHNICAL FIELD

The present invention relates to an aqueous pigment dispersion.

BACKGROUND ART

In the related art, a method of dispersing a pigment in an aqueous medium in the field of inkjet includes a method using a surfactant, a method of modifying the pigment surface with a hydrophilic group, a method of dispersing a pigment with a hydrophilic resin, and the like.

Among these methods, examination of the method of dispersing a pigment with a hydrophilic resin has been promoted because high dispersion stability is obtained and the aqueous pigment dispersion can have rub resistance. Examples thereof include an aqueous pigment dispersion prepared by dispersing a pigment with a polyurethane resin having an anionic group (Patent Literature 1).

Furthermore, use of pigment printing in the inkjet field allowing printing by Drop On Demand has been expected in recent years. Compared to traditional dye printing, pigment printing is a simple processing method because it is unnecessary to select the type of colorants according to the type of fabrics, and has low energy cost because it does not need steaming, water washing, and soaping steps. In addition, it is an environmentally safe processing method because no waste solution is generated. High rub resistance is required in applications of pigment printing. For example, aqueous pigment dispersions prepared by dispersing pigments with polyurethane resins having a variety of compositions are disclosed (Patent Literature 2).

Unlike dye printing, in pigment printing, the pigment as a color material is physically fixed onto a fabric with a binder resin. This leads to a problem such as peel off of the pigment from printed regions of the fabric due to washing or external rubbing. The aqueous pigment dispersion prepared in Patent Literature 1 results in high image density when the recording medium is paper, while it results in insufficient washing fastness and rubbing fastness in printing on fabrics. In Patent Literature 2, a pigment dispersion having high initial dispersibility and high storage stability is prepared, while rub resistance in cotton fabrics and color developability of printed materials are still insufficient.

CITATION LIST

Patent Literature

Patent Literature 1: JP 2017-114991 A
Patent Literature 2: JP 2018-154829 A

SUMMARY OF INVENTION

Technical Problem

An object of the present invention is to provide an aqueous pigment dispersion having high initial dispersibility, high storage stability, and high color developability after printing, and particularly having high rub resistance (rubbing fastness) in cotton fabrics.

Solution to Problem

The present inventors, who have conducted extensive research, have achieved the present invention. Specifically, the present invention is an aqueous pigment dispersion for an aqueous inkjet ink, including a pigment and an aqueous medium, the pigment being dispersed with a polyurethane resin prepared by reacting an active hydrogen atom-containing component (A) with an organic polyisocyanate component (B), the active hydrogen atom-containing component (A) containing a polycarbonate polyol (a1), the organic polyisocyanate component (B) containing at least one compounds selected from the group consisting of aliphatic polyisocyanates (b1), alicyclic polyisocyanates (b2), and aromatic polyisocyanates (b3), wherein a coating film formed by drying the aqueous pigment dispersion at 50° C. for 12 hours has a storage modulus G' at 160° C. of 1 to 10 MPa.

Advantageous Effects of Invention

The present invention can provide an aqueous pigment dispersion having high initial dispersibility, high storage stability, and high color developability after printing, and particularly having high rub resistance (rubbing fastness) in cotton fabrics.

DESCRIPTION OF EMBODIMENTS

The aqueous pigment dispersion according to the present invention is an aqueous pigment dispersion for an aqueous inkjet ink, including a pigment and an aqueous medium, the pigment being dispersed with a polyurethane resin prepared by reacting an active hydrogen atom-containing component (A) with an organic polyisocyanate component (B), the active hydrogen atom-containing component (A) containing a polycarbonate polyol (a1), the organic polyisocyanate component (B) containing at least one compounds selected from the group consisting of aliphatic polyisocyanates (b1), alicyclic polyisocyanates (b2), and aromatic polyisocyanates (b3), wherein a coating film formed by drying the aqueous pigment dispersion at 50° C. for 12 hours has a storage modulus G' at 160° C. of 1 to 10 MPa.

The active hydrogen atom-containing component (A) used in the polyurethane resin contains a polycarbonate polyol (a1) as an essential constitutional component.

Examples of polycarbonate polyols (a1) include polycarbonate polyols prepared by condensing a low molecular weight dihydric alcohol having a number average molecular weight (Mn) of less than 300 and a low molecular carbonate compound (such as a dialkyl carbonate having alkyl groups having 1 to 10 carbon atoms, an alkylene carbonate having an alkylene group having 2 to 6 carbon atoms, or a diaryl carbonate having an aryl group having 6 to 9 carbon atoms) while performing dealcohlation. These low molecular weight dihydric alcohols and these low molecular carbonate compounds each may be used alone or in combination. The low molecular weight dihydric alcohols described above may contain tri- or higher hydric alcohols.

Specific examples of polycarbonate polyols include aliphatic polycarbonate polyols such as polyhexamethylene carbonate diol, polydecamethylene carbonate diol, polypentamethylene carbonate diol, 3-methyl-5-pentane-carbonate diol, polytetramethylene carbonate diol, and poly(tetramethylene/hexamethylene) carbonate diol (such as diols prepared by condensing 1,4-butanediol and 1,6-hexanediol with a dialkyl carbonate while performing dealcohlation). Examples of alicyclic polycarbonate polyols include polycyclohexamethylene carbonate diol, and polynorbornene carbonate diol. Examples of aromatic polycarbonate polyols include poly-1,4-xylylene carbonate diol, bisphenol A-type polycarbonate diol, and bisphenol F-type polycarbonate diol.

Examples of commercial products of polycarbonate polyols include ETERNACOLL UH-200 [polyhexamethylene carbonate diol having an Mn of 2,000, available from UBE Corporation], ETERNACOLL UH-100 [polyhexamethylene carbonate diol having an Mn of 1,000, available from UBE Corporation], ETERNACOLL UC-100 [polycyclohexamethylene carbonate diol having an Mn of 1,000, available from UBE Corporation], BENEBiOL NL2010DB [polydecamethylene carbonate diol having an Mn of 2,000, available from Mitsubishi Chemical Corporation], DURANOL T5651 [polypentamethylene, hexamethylene carbonate diol having an Mn of 1,000, available from Asahi Kasei Chemicals Corporation], and DURANOL G4672 [polytetramethylene, hexamethylene carbonate diol having an Mn of 1,000, available from Asahi Kasei Chemicals Corporation].

According to one aspect, the polycarbonate polyol (a1) of the present invention is preferably a crystalline polycarbonate polyol.

In the present invention, the term "crystallinity" indicates that the peak top temperature of an endothermic peak is present when the transition temperature of a sample is measured using a differential scanning calorimeter (DSC) by the method according to JIS K7121.

The measurement conditions for the peak top temperature of the endothermic peak are shown below.

The peak top temperature is measured using a differential scanning calorimeter (e.g., Q2000 available from TA Instruments-Waters LLC). The sample is heated from 20° C. to 150° C. at 10° C./min in a first heating operation, and then is cooled from 150° C. to 0° C. at 10° C./min, and subsequently is heated from 0° C. to 150° C. at 10° C./min in a second heating operation. The temperature indicating the top of the endothermic peak in the second heating operation is defined as peak top temperature of the endothermic peak.

If the polyurethane resin contains a polyol component containing a crystalline polycarbonate polyol in its constitutional monomer (constitutional unit), the mechanical strength thereof can be improved, and thus the rub resistance thereof can be improved.

Examples of the crystalline polycarbonate polyol include polycarbonate polyols prepared by condensing a saturated low molecular weight aliphatic or alicyclic dihydric alcohol and a low molecular carbonate compound (such as a dialkyl carbonate having an alkyl group having 1 to 10 carbon atoms, an alkylene carbonate having an alkylene group having 2 to 6 carbon atoms, and a diaryl carbonate having an aryl group having 6 to 9 carbon atoms) while performing dealcohlation. Although these low molecular weight dihydric alcohols may be used in combination and these low molecular carbonate compounds may be used in combination, the content of a single alcohol raw material is preferably 70 to 100% by weight, more preferably 100% by weight from the viewpoint of crystallinity.

Specific examples of the crystalline polycarbonate polyol include polyhexamethylene carbonate diol, polydecamethylene carbonate diol, and polycyclohexamethylene carbonate diol.

The active hydrogen atom-containing component (A) may contain a polyol other than the polycarbonate polyol (a1). Examples of the polyol other than the polycarbonate polyol (a1) include polyester polyols, polyether polyols, low molecular weight polyols, and polyols having a hydrophilic group. These polyols other than the polycarbonate polyol (a1) may be used alone or in combination. Among these, preferred are low molecular weight polyol and polyols having a hydrophilic group.

Examples of polyester polyols include condensed polyester polyols, polylactone polyols, and castor oil-based polyols.

The condensed polyester polyol is a polyester polyol of a low molecular weight dihydric alcohol having a number average molecular weight (Mn) of less than 300 and a dicarboxylic acid having 2 to 10 carbon atoms or an ester formable derivative thereof.

Examples of usable low molecular weight dihydric alcohols include divalent aliphatic dihydric alcohols having an Mn of less than 300 and low mole adducts of alkylene oxides (hereinafter, abbreviated to AO in some cases) of divalent phenols having an Mn of less than 300.

Examples of the AO include ethylene oxides (hereinafter, abbreviated to EOs in some cases), propylene oxides (hereinafter, abbreviated to POs in some cases), and 1,2-, 1,3-, 2,3-, or 1,4-butylene oxides.

Among these low molecular weight dihydric alcohols which can be used for the condensed polyester polyol, preferred are ethylene glycol, propylene glycol, 1,4-butanediol, neopentyl glycol, 1,6-hexane glycol, 1,9-nonanediol, 1,10-decanediol, EO or PO low mole adducts of bisphenol A, and combinations thereof. A tri- or higher hydric alcohol and a tri- or higher valent carboxylic acid or an ester formable derivative thereof may be contained as the constitutional components for forming the condensed polyester polyol.

Examples of the dicarboxylic acids having 2 to 10 carbon atoms or ester formable derivatives thereof which can be used in the condensed polyester polyols include aliphatic dicarboxylic acids (such as succinic acid, adipic acid, azelaic acid, sebacic acid, dodecanedioic acid, fumaric acid, and maleic acid), alicyclic dicarboxylic acids (such as dimer acid), aromatic dicarboxylic acids (such as terephthalic acid, isophthalic acid, and phthalic acid), anhydrides thereof (such as succinic anhydride, maleic anhydride, and phthalic anhydride), acid halides thereof (such as adipic acid dichloride), low molecular weight alkyl esters thereof (such as dimethyl succinate and dimethyl phthalate), and combinations thereof. Examples of the tri- or higher valent polycarboxylic acids include trimellitic acid, and pyromellitic acid.

Specific examples of the condensed polyester polyol include polyethylene adipate diol, polybutylene adipate diol, polyhexamethylene adipate diol, polyhexamethylene isophthalate diol, polyhexamethylene terephthalate diol, polyneopentyl adipate diol, polyethylene propylene adipate diol, polyethylene butylene adipate diol, polybutylene hexamethylene adipate diol, polydiethylene adipate diol, poly(polytetramethylene ether)adipate diol, poly(3-methylpentylene adipate) diol, polyethylene azelate diol, polyethylene sebacate diol, polybutylene azelate diol, polybutylene sebacate diol, and polyneopentyl terephthalate diol.

Examples of commercial products of the condensed polyester polyols include SANESTER 2610 [polyethylene adipate diol having an Mn of 1,000, available from Sanyo Chemical Industries, Ltd.], SANESTER 4620 [polytetramethylene adipate diol having an Mn of 2,000, available from Sanyo Chemical Industries, Ltd.], SANESTER 2620 [polyethylene adipate diol having an Mn of 2,000, available from Sanyo Chemical Industries, Ltd.], Kuraray Polyol P-2010 [poly-3-methyl-1,5-pentane adipate diol having an Mn of 2,000], Kuraray Polyol P-3010 [poly-3-methyl-1,5-pentane adipate diol having an Mn of 3,000], Kuraray Polyol P-6010 [poly-3-methyl-1,5-pentane adipate diol having an Mn of 6,000], Kuraray Polyol P-2020 [poly-3-methyl-1,5-pentane terephthalate diol having an Mn of 2,000], and Kuraray Polyol P-2030 [poly-3-methyl-1,5-pentane isophthalate diol having an Mn of 2,000].

Examples of the polylactone polyols include polylactonediol, polycaprolactonediol, polyvalerolactonediol, and polycaprolactone triol.

The polylactonediol is a polyadded product of a lactone added to the low molecular weight dihydric alcohols described above, and examples of lactones include lactones having 4 to 12 carbon atoms (such as γ-butyrolactone, γ-valerolactone, and ε-caprolactone).

Examples of the castor oil-based polyols include castor oil, and modified castor oils modified with a polyol or an AO. The modified castor oil can be prepared through ester exchange between castor oil and a polyol and/or AO addition. Examples of the castor oil-based polyols include castor oil, trimethylolpropane-modified castor oil, pentaerythritol-modified castor oil, and EO (4 to 30 mol) adducts of castor oil.

Examples of the polyether polyols include aliphatic polyether polyols and aromatic ring-containing polyether polyols.

Examples of the aliphatic polyether polyols include polyoxyethylene polyols [such as polyethylene glycol (hereinafter, abbreviated to PEG)], polyoxypropylene polyols [such as polypropylene glycol], polyoxyethylene/propylene polyol, and polytetramethylene ether glycol.

Examples of commercial products of the aliphatic polyether polyols include PTMG1000 [polytetramethylene ether glycol having an Mn of 1,000, available from Mitsubishi Chemical Corporation], PTMG2000 [polytetramethylene ether glycol having an Mn of 2,000, available from Mitsubishi Chemical Corporation], PTMG3000 [polytetramethylene ether glycol having an Mn of 3,000, available from Mitsubishi Chemical Corporation], PTGL3000 [modified PTMG having an Mn of 3,000, available from HODOGAYA CHEMICAL CO., LTD.], and SANNIX GP-3000 [polypropylene ether triol having an Mn of 3,000, available from Sanyo Chemical Industries, Ltd.].

Examples of the aromatic ring-containing polyether polyols include polyols having a bisphenol structure such as EO adducts of bisphenol A [such as EO 2 mol adduct of bisphenol A, EO 4 mol adduct of bisphenol A, EO 6 mol adduct of bisphenol A, EO 8 mol adduct of bisphenol A, EO 10 mol adduct of bisphenol A, and EO 20 mol adduct of bisphenol A] and PO adducts of bisphenol A [such as PO 2 mol adduct of bisphenol A, PO 3 mol adduct of bisphenol A, and PO 5 mol adduct of bisphenol A]; and EO or PO adducts of resorcin.

Preferred low molecular weight polyols are low molecular weight diols. Examples of the low molecular weight diols include the above-mentioned saturated aliphatic diols having 2 to 20 carbon atoms. Preferred are linear diols having 4 to 10 carbon atoms, more preferred are 1,4-butanediol, 1,5-pentanediol, and 1,6-hexanediol, and still more preferred is 1,4-butanediol. Use of a low molecular weight polyol is preferred because it enhances the aggregation force between hard segments (urethane bond moieties) in the polyurethane resin, resulting in improved saturated water absorption amount and mechanical strength, and high rub resistance (particularly wet rubbing fastness). When the active hydrogen atom-containing component (A) contains a low molecular weight polyol, the content of the low molecular weight polyol is preferably 0.1 to 4.5% by weight, more preferably 0.3 to 2% by weight relative to the total weight of the active hydrogen atom-containing component (A) and the organic polyisocyanate component (B).

In the polyols having a hydrophilic group, the hydrophilic group indicates a carboxyl group, a carboxylate anion group, a sulfo group, and a sulfamic acid group. It is sufficient that the polyol having a hydrophilic group has any one of these hydrophilic groups, and it may have two or more thereof. The hydrophilic group is preferably a carboxyl group and/or a carboxylate anion group. Preferred polyols having a hydrophilic group are diols having a hydrophilic group.

Examples of the polyols having a hydrophilic group include diols having 2 to 10 carbon atoms and having a carboxyl group [such as dialkylol alkane acids (such as 2,2-dimethylolpropionic acid, 2,2-dimethylolbutanoic acid, 2,2-dimethylolheptanoic acid, and 2,2-dimethyloloctanoic acid), and tartaric acid], compounds having 2 to 16 carbon atoms and having a sulfo group [such as 3-(2,3-dihydroxypropoxy)-1-propanesulfonic acid], compounds having 2 to 10 carbon atoms and having a sulfamic acid group [such as N,N-bis(2-hydroxyethyl)sulfamic acid], and salts of these compounds prepared through neutralization thereof with a neutralizer described later. Among these, preferred are diols having a carboxyl group and/or a carboxylate anion group and salts thereof prepared through neutralization thereof with a neutralizer, more preferred are 2,2-dimethylolpropionic acid, 2,2-dimethylolbutanoic acid, and salts thereof prepared through neutralization thereof with a neutralizer, and still more preferred are 2,2-dimethylolpropionic acid and salts thereof prepared through neutralization thereof with a neutralizer. These polyols having a hydrophilic group may be used alone or in combination.

Examples of the neutralizer used in neutralization of the polyols having a hydrophilic group include ammonia, amine compounds having 1 to 20 carbon atoms, and hydroxides of alkali metals (such as sodium, potassium, and lithium).

Examples of the amine compounds having 1 to 20 carbon atoms include primary amines such as monomethylamine, monoethylamine, monobutylamine, monoethanolamine, and 2-amino-2-methyl-1-propanol; secondary amines such as dimethylamine, diethylamine, dibutylamine, diethanolamine, and N-methyldiethanolamine; and tertiary amines such as trimethylamine, triethylamine, dimethylethylamine, and triethanolamine.

Among these, preferred are amine compounds having 1 to 20 carbon atoms, and more preferred is triethylamine from the viewpoint of the saturated water absorption rate of the dry coating film formed by drying the aqueous pigment dispersion.

Among these, preferred are hydroxides of alkali metals (such as sodium, potassium, and lithium), and more preferred is potassium hydroxide from the viewpoint of the initial dispersibility of the aqueous pigment dispersion.

According to one aspect, the aqueous pigment dispersion preferably contains a polyol having a hydrophilic group. When a polyurethane resin contains a polyol having a hydrophilic group as a constitutional monomer, it is preferred because the particle size of the aqueous pigment dispersion is reduced and the aqueous dispersion has a sharp particle size distribution.

The weight proportion of the polyol having a hydrophilic group is preferably 2.5 to 9.0% by weight, more preferably 4.0 to 6.0% by weight relative to the total weight of the active hydrogen atom-containing component (A) and the organic polyisocyanate component (B) from the viewpoint of the initial dispersibility, storage stability of the aqueous pigment dispersion.

The organic polyisocyanate component (B) used in the polyurethane resin contains at least one compounds selected from the group consisting of aliphatic polyisocyanates (b1), alicyclic polyisocyanates (b2), and aromatic polyisocyanates (b3) as (an) essential constitutional component(s). Examples of the organic polyisocyanate component (B) include aromatic aliphatic polyisocyanates having 8 to 15 carbon atoms and derivatives of these polyisocyanates (such as isocyanurated products).

These organic polyisocyanate components (B) may be used alone or in combination.

Examples of the aliphatic polyisocyanates (b1) include aliphatic polyisocyanate having 2 to 18 carbon atoms (such as ethylene diisocyanate, tetramethylene diisocyanate, hexamethylene diisocyanate (HDI), dodecamethylene diisocyanate, 2,2,4-trimethyl hexamethylene diisocyanate, lysine diisocyanate, and 2-isocyanatoethyl-2,6-diisocyanatohexanoate).

Examples of the alicyclic polyisocyanates (b2) include alicyclic polyisocyanates having 4 to 15 carbon atoms (isophorone diisocyanate (IPDI), dicyclohexylmethane 4,4-diisocyanate (hydrogenated MDI), cyclohexylene diisocyanate, methylcyclohexylene diisocyanate (hydrogenated TDI), bis(2-isocyanatoethyl)-4-cyclohexene-1,2-dicarboxylate, and 2,5- or 2,6-norbornane diisocyanate).

Examples of the aromatic polyisocyanates (b3) include aromatic polyisocyanates having 6 to 20 carbon atoms (1,3- or 1,4-phenylene diisocyanate, 2,4- or 2,6-tolylene diisocyanate (TDI), 4,4'- or 2,4'-diphenylmethane diisocyanate (MDI), 1,5-naphthylene diisocyanate, 4,4',4"-triphenylmethane triisocyanate, m- or p-isocyanatophenyl sulfonyl isocyanate, and crude MDIs).

The organic polyisocyanate component (B) used in the polyurethane resin may contain an organic polyisocyanate component other than the at least one compounds selected from the group consisting of aliphatic polyisocyanates (b1), alicyclic polyisocyanates (b2), and aromatic polyisocyanates (b3) as (an) essential constitutional component(s). Examples of the organic polyisocyanate component other than the compound(s) include aromatic aliphatic polyisocyanates (b4) and derivatives of (b1) to (b4) (such as isocyanurated products).

Examples of the aromatic aliphatic polyisocyanates (b4) include aromatic aliphatic polyisocyanates having 8 to 15 carbon atoms (m- or p-xylylene diisocyanate (XDI), α,α,α',α'-tetramethylxylylene diisocyanate (TMXDI)).

The organic polyisocyanate component (B) is preferably aliphatic polyisocyanates (b1) and alicyclic polyisocyanates (b2), more preferably alicyclic polyisocyanates (b2), still more preferably IPDI and hydrogenated MDI from the viewpoint of the initial dispersibility of the aqueous pigment dispersion and mechanical strength of the polyurethane resin.

From the viewpoint of a uniform composition distribution of the polyurethane resin and the mechanical strength thereof, the equivalent ratio (NCO/OH) of the isocyanate group contained in the organic polyisocyanate component (B) to the hydroxyl group contained in the active hydrogen atom-containing component (A) is preferably 1.2 to 1.8, more preferably 1.3 to 1.6.

While the active hydrogen atom-containing component (A) described above and the organic polyisocyanate component (B) are essential components of the constitutional monomer (constitutional unit) of the polyurethane resin, the components for forming the constitutional monomer may include a compound other than the active hydrogen atom-containing component (A) and the organic polyisocyanate component (B). Examples of the compound other than the active hydrogen atom-containing component (A) and the organic polyisocyanate component (B) contained in the constitutional monomer include chain extenders, and reaction terminators. These may be used alone or in combination. According to one aspect, the polyurethane resin is preferably a reaction product of a urethane prepolymer with a chain extender, the urethane prepolymer being terminated with an isocyanate group formed by reacting the active hydrogen atom-containing component (A) described above with the organic polyisocyanate component (B).

A chain extender is preferably used in the polyurethane resin. Examples of chain extenders include water, diamines having 2 to 10 carbon atoms (such as ethylenediamine, propylenediamine, hexamethylenediamine, isophoronediamine, toluenediamine, and piperazine), polyalkylene polyamines having 2 to 10 carbon atoms (such as diethylenetriamine, triethylenetetramine, and tetraethylenepentamine), hydrazine or derivatives thereof (dibasic acid dihydrazides such as adipic acid dihydrazide), polyepoxy compounds having 2 to 30 carbon atoms (such as 1,6-hexanediol diglycidyl ether and trimethylolpropane polyglycidyl ether), and amino alcohols having 2 to 10 carbon atoms (such as ethanolamine, diethanolamine, 2-amino-2-methylpropanol, and triethanolamine). As the chain extender, preferred are diamines having 2 to 10 carbon atoms, more preferred are secondary diamines, and still more preferred is isophoronediamine. If the polyurethane resin contains the above-mentioned compound in the constitutional monomer, the aggregation force of the urethane group moiety is increased to reduce the degree of swelling to water. Thus, high wet rubbing fastness is demonstrated. Use of diamines is preferred because generation of carbon dioxide gas is suppressed by extension reaction by amine and the amount of amine carbonate salts generated is reduced to enhance storage stability.

The amount of the chain extender to be used is in the range such that the equivalent ratio of the active hydrogen-containing group in the chain extender to the terminal isocyanate group in the urethane prepolymer is preferably 0.1 to 2.0, more preferably 0.5 to 1.5.

A reaction terminator can be used in the polyurethane resin as needed. Examples of the reaction terminator include monoalcohols having 1 to 8 carbon atoms (such as methanol, ethanol, isopropanol, cellosolve, and carbitols), and monoamines having 1 to 10 carbon atoms (such as mono- or dialkylamine such as monomethylamine, monoethylamine, monobutylamine, dibutylamine, and monooctylamine; and mono- or dialkanolamines such as monoethanolamine, diethanolamine, and diisopropanolamine).

A coating film formed by drying the aqueous pigment dispersion according to the present invention at 50° C. for 12 hours has a storage modulus G' at 160° C. of 1 to 10 MPa. The coating film more preferably has a storage modulus G' at 160° C. of 2 to 5 MPa. If the storage modulus of the coating film falls within this range, the mechanical strength of the coating film is further enhanced, thus enhancing the rubbing fastness of ink printed materials to which the aqueous pigment dispersion is applied. Moreover, because the aqueous pigment dispersion after dried by heating forms into a uniform coating, the pigment particles are homogeneously dispersed inside the coating, thereby enhancing the color developability.

If the coating film has a storage modulus G' of less than 1 MPa, the coating film has insufficient mechanical strength, which results in a reduction in rubbing fastness of ink printed materials to which the aqueous pigment dispersion is applied. If the coating film has a storage modulus G' of more than 10 MPa, the aqueous pigment dispersion after dried by heating forms into a non-uniform coating. Thus, the pigment is localized inside the coating, reducing the color developability of printed materials.

The method of measuring the storage modulus will be described in Examples.

The storage modulus G' at 160° C. of the coating film prepared by drying the aqueous pigment dispersion at 50° C. for 12 hours can be determined by the molecular weight of the polyurethane resin and the urethane group content in the polyurethane resin described later.

In this specification, the storage modulus G' at 160° C. indicates the value of the storage modulus measured by a rheometer at a temperature of 160° C. at the end of increasing the temperature. The conditions for measurement of the storage modulus G' will be described in Examples.

The molecular weight of the polyurethane resin can be arbitrarily controlled by the amount of the above-mentioned chain extender to be used. From the viewpoint of the mechanical strength, which determines the rubbing fastness, the weight average molecular weight is preferably 30000 to 120000, more preferably 80000 to 110000, which is obtained against polystyrene resin standards in gel permeation chromatography (GPC). If the weight average molecular weight in GPC is less than 30000, the polyurethane resin has insufficient mechanical strength, which results in a reduction in rubbing fastness of ink printed materials to which the aqueous pigment dispersion is applied. If the weight average molecular weight in GPC is too large to measure because the polyurethane resin is not dissolved in a solvent for measurement or if the polyurethane resin has a cross-linking structure and is not dissolved in a solvent for measurement, the coating film will have a storage modulus G' at 160° C. of more than 10 MPa. In this case, the aqueous pigment dispersion after dried by heating forms into a non-uniform coating. Thus, the pigment is localized inside the coating, reducing the color developability of printed materials.

According to one aspect, the polyurethane resin preferably has an acid value of 10 to 40 mgKOH/g. The polyurethane resin has an acid value of more preferably 15 to 35 mgKOH/g, still more preferably 19 to 31 mgKOH/g. If the acid value is less than 10 mgKOH/g, the aqueous pigment dispersion contains coarse particles, reducing the initial dispersibility. If the acid value is more than 40 mgKOH/g, a water-soluble component increases and thus the viscosity of the aqueous pigment dispersion increases, reducing the initial dispersibility.

The acid value of the resin can be measured by the method specified in JIS K0070 (1992).

According to one aspect, the content of the urethane group in the polyurethane resin is preferably 1.1 to 2.3 mol/kg. The content is more preferably 1.4 to 1.8 mol/kg. If the content is less than 1.1 mol/kg, the polyurethane resin has insufficient mechanical strength, which results in a reduction in rubbing fastness of ink printed materials to which the aqueous pigment dispersion is applied. If the content is more than 2.3 mol/kg, the storage modulus at 160° C. of the coating film increases when the molecular weight of the polyurethane resin is adjusted to satisfy the rubbing fastness. This reduces the color developability of printed materials.

The polyurethane resin according to the present invention can be prepared by any method, and examples of the method include methods [1] to [3] below:

[1] A method of reacting a polyol component with an organic polyisocyanate component in the presence or absence of a hydrophilic solvent in a single or multiple stages to prepare a polyurethane resin terminated with an isocyanate group.

[2] A method of reacting a polyol component, and an organic polyisocyanate component in the presence or absence of a hydrophilic solvent in a single or multiple stages to prepare a polyurethane resin terminated with an isocyanate group, then reacting the chain extender and/or the reaction terminator with the isocyanate group in the polyurethane resin.

[3] A method of reacting a polyol component with an organic polyisocyanate component in the presence or absence of a hydrophilic solvent in a single or multiple stages to prepare a polyurethane resin terminated with an isocyanate group; then dispersing the polyurethane resin in the form of a salt in an aqueous medium by neutralizing carboxyl groups with a neutralizer; and reacting a chain extender and/or a reaction terminator with the isocyanate groups in the polyurethane resin, and optionally distilling off the hydrophilic solvent.

The polyurethane resins prepared by the methods [1] to [3] above can be used in preparation of the aqueous pigment dispersion. Among these, more preferred are methods [1] and [2] from the viewpoint of the storage stability of the aqueous pigment dispersion.

Examples of the hydrophilic solvent used in preparation of the polyurethane resin by the method [3] described above include those substantially unreactive with the isocyanate group (ketones such as acetone and ethyl methyl ketone, esters, ethers, amides, and alcohols). Among these, preferred is tetrahydrofuran. The aqueous medium may be water alone, and a mixed solution of water and a hydrophilic solvent can also be used. The weight ratio of the hydrophilic solvent to water (hydrophilic solvent/water) is preferably 0/100 to 50/50, more preferably 35/65 to 45/55.

If the hydrophilic solvent is used, the hydrophilic solvent may be distilled off, as needed, after the polyurethane resin is prepared.

When a polyol having a hydrophilic group is used, the compound can be neutralized with a neutralizer before, after, or during preparation of the polyurethane resin. The neutralization imparts favorable dispersion stability of the aqueous pigment dispersion during emulsion.

The polyurethane resin terminated with an isocyanate group is synthesized through a reaction at preferably 20° C. to 150° C., more preferably 60° C. to 110° C., and the reaction time is preferably 2 to 20 hours.

The polyurethane resin terminated with an isocyanate group can be prepared in the presence or absence of an organic solvent substantially non-reactive with the isocyanate group. The polyurethane resin terminated with an isocyanate group usually contains 0.5 to 10% of free isocyanate group. Examples of the organic solvent substantially unreactive with the isocyanate group include the hydrophilic solvents listed above. Preferred is tetrahydrofuran.

In preparation of the polyurethane resin terminated with the isocyanate group, a catalyst usually used in a urethane reaction may be used to accelerate the reaction as needed. Examples of the catalyst include amine catalysts, such as triethylamine, N-ethylmorpholine, triethylenediamine, and cycloamidines described in the specification of U.S. Pat. No. 4,524,104 [such as 1,8-diaza-bicyclo(5,4,0)undecene-7 (available from San-Apro Ltd., DBU)]; tin-based catalysts, such as dibutyltin dilaurate, dioctyltin dilaurate, and tin octylate; and titanium-based catalysts, such as tetrabutyl titanate.

The content of the isocyanate group in the polyurethane resin can be measured by the method specified in JIS K1603-1. In Examples described in this specification, the content (NCO % by weight) of the isocyanate group in the solvent solution was used.

The urea group is contained in a proportion of preferably 0.01 to 0.2% by weight, more preferably 0.05 to 0.1% by weight of the weight of the polyurethane resin. The urea group contained in a proportion of 0.01 to 0.2% by weight (preferably 0.05 to 0.1% by weight) of the weight of the polyurethane resin is preferred because the polyurethane resin contains the urea group in an appropriate amount, leading to compatibility between mechanical strength of the polyurethane resin and the viscosity of the aqueous dispersion.

Examples of the pigment in the present invention include organic and inorganic pigments known in the related art or the like (such as white pigments, black pigments, gray pigments, red pigments, brown pigments, yellow pigments, green pigments, blue pigments, violet pigments, metallic pigments, natural organic pigments, synthetic organic pigments, nitroso pigments, nitro pigments, pigment dye-type azo pigments, azo lakes made from water-soluble dyes, azo lakes made from poorly soluble dyes, lakes made from basic dyes, lakes made from acidic dyes, xanthan lakes, anthraquinone lakes, pigments made from vat dyes, phthalocyanine pigments, and organic pigments such as daylight fluorescent pigments).

Specific examples of the organic and inorganic pigments are listed below.

Examples of white pigments include inorganic pigments such as titanium oxide, zinc oxide, zinc sulfide, antimony oxide, and zirconium oxide. Other than the inorganic pigment, hollow resin fine particles and polymer fine particles can also be used.

The pigment preferably has an average particle size of 200 to 300 nm. If the pigment has an average particle size of less than 200 nm, the hiding power tends to be insufficient. If the pigment has an average particle size of more than 300 nm, the ejection stability tends to be insufficient. Among these, preferred is use of titanium oxide from the viewpoint of the hiding power. Preferably, titanium oxide also has an average particle size of 200 to 300 nm.

Examples of magenta pigments include, but is not limited to, C.I. Pigment Red 2, C.I. Pigment Red 3, C.I. Pigment Red 5, C.I. Pigment Red 6, C.I. Pigment Red 7, C.I. Pigment Red 15, C.I. Pigment Red 16, C.I. Pigment Red 48:1, C.I. Pigment Red 53:1, C.I. Pigment Red 57:1, C.I. Pigment Red 122, C.I. Pigment Red 123, C.I. Pigment Red 139, C.I. Pigment Red 144, C.I. Pigment Red 149, C.I. Pigment Red 166, C.I. Pigment Red 177, C.I. Pigment Red 178, and C.I. Pigment Red 222.

Examples of yellow pigments include, but is not limited to, C.I. Pigment orange 31, C.I. Pigment orange 43, C.I. Pigment Yellow 12, C.I. Pigment Yellow 13, C.I. Pigment Yellow 14, C.I. Pigment Yellow 15, C.I. Pigment Yellow 17, C.I. Pigment Yellow 74, C.I. Pigment Yellow 93, C.I. Pigment Yellow 94, C.I. Pigment Yellow 128, C.I. Pigment Yellow 138, C.I. Pigment Yellow 155, and C.I. Pigment Yellow 180.

Examples of cyan pigments include, but is not limited to, C.I. Pigment Blue 15, C.I. Pigment Blue 15:2, C.I. Pigment Blue 15:3, C.I. Pigment Blue 15:4, C.I. Pigment Blue 16, C.I. Pigment Blue 60, and C.I. Pigment green 7.

Examples of black pigments include carbon blacks (C.I. Pigment Black 7) such as furnace black, lamp black, acetylene black, and channel black; metals such as copper and iron (C.I. Pigment Black 11); metal compounds such as titanium oxide; and organic pigments such as aniline black (C.I. Pigment Black 1).

In the present invention, the total weight of the pigment and the polyurethane resin in the aqueous pigment dispersion is preferably 10 to 40% by weight, more preferably 20 to 30% by weight from the viewpoint of storage stability.

In the aqueous pigment dispersion according to the present invention, the ratio of the pigment to the polyurethane resin (pigment:polyurethane resin) is preferably 80:40 to 20:60 from the viewpoint of initial dispersibility and rubbing fastness.

In the aqueous pigment dispersion, usually, particles containing a pigment and the polyurethane resin are dispersed in water. For the color pigment, the particle size of particles in the aqueous pigment dispersion is preferably 100 to 200 nm, more preferably 120 to 180 nm from the viewpoint of storage stability and viscosity. For the white pigment, the particle size is preferably 200 to 400 nm, more preferably 220 to 300 nm. In the present invention, the particle size indicates a cumulant average particle size. The particle size can be measured with a light scattering particle size distribution analyzer [such as "DLS-8000" available from Otsuka Electronics Co., Ltd.], and can be determined.

<Method of Preparing Aqueous Pigment Dispersion>

As the method of preparing the aqueous pigment dispersion, methods known in the related art all can be used. Examples of methods known in the related art include a surface polymerization method of adsorbing a monomer on the surface of the pigment dispersion, and polymerizing the monomer; a surface deposition method of dispersing a pigment in a resin solution, adding a poor solvent to the resin, and depositing the resin on the pigment surface; a kneading and pulverization method of melt kneading a pigment and a resin to form a masterbatch, and wet pulverizing the masterbatch into fine particles; a method of simultaneously achieving permeation of a resin solution into pigment aggregates using a high pressure fluid, pulverization by expansion energy when discharged under an atmospheric pressure, and coating; a method of wet pulverizing a pigment and a resin aqueous dispersion into fine particles, and dispersing the fine particles by mechanical energy; and a phase inversion emulsion method of wet pulverizing a resin solution having self-dispersibility to water and a pigment into fine particles, and adding water to the solvent phase of the resin solution to prepare an aqueous pigment dispersion.

Among these methods, methods suitable for preparing the aqueous pigment dispersion according to the present invention are the method of wet pulverizing a pigment and a resin aqueous dispersion into fine particles and dispersing the fine particles by mechanical energy and the phase inversion emulsion method from the viewpoint of initial dispersibility and storage stability.

The method of dispersing a pigment and a resin aqueous dispersion by mechanical energy and the phase inversion emulsion method are also preferred from the viewpoint of fastness because a polyurethane resin having self-dispersibility to form a coating adsorbs on surface of pigment particles or pigment particles are modified with a polyurethane resin having self-dispersibility to form a coating, and thus, the pigment as a color material can be fixed on the substrate without adding any other binder resin to the ink.

More preferred is the phase inversion emulsion method from the viewpoint of storage stability because the pigment surface is modified with a resin, thereby reducing the frequency that the pigment surface is exposed to the ink, leading to dispersed particles having no composition distribution and obstruction of change in structure.

In the aqueous pigment dispersion according to the present invention, the polyurethane resin adsorbs on or adheres to surfaces of pigment particles, which alone are hardly dispersed in the aqueous medium. Thereby, pigment particles to which the resin adheres are dispersed in the aqueous medium. It is inferred that the pigment particles to which the resin adheres are resin-coated pigment particles in which peripheries of the pigment particles are coated with the polyurethane resin.

The methods include preparation methods [A] to [C] below.

[A] A method of adding a pigment to a polyurethane resin solution containing the polyurethane resin terminated with an isocyanate group, which is prepared by the method [1] of preparing the polyurethane resin described in this specification, and mixing and homogenizing these materials. An apparatus for preparing the polyurethane resin can be used as it is as an apparatus used in mixing and homogenizing. In the next step, the solvent solution containing the pigment is mechanically disintegrated into a fine state. Examples of a dispersing machine used in this step include a paint shaker, a ball mill, a sand mill, and a nano mill. Specifically, examples thereof include Dyno-Mill (available from SHINMARU ENTERPRISES CORPORATION) and TSU-6U (available from Aimex Co., Ltd.). Thereafter, carboxyl groups are neutralized with a neutralizer, and the polyurethane resin is dispersed in the form of a salt in an aqueous medium. Then, a chain extender and/or a reaction terminator is reacted with isocyanate groups in the polyurethane resin, and the hydrophilic solvent is distilled off as needed.

[B] A pigment is added to, and mixed and homogenized with a polyurethane solution containing the polyurethane resin prepared by the method [2] of preparing the polyurethane resin, which is described in this specification. An apparatus for preparing the polyurethane resin can be used as it is as an apparatus used in mixing and homogenizing. In the next step, the solvent solution containing the pigment is mechanically disintegrated into a fine state. As the dispersing machine used in this step, Dyno-Mill (available from SHINMARU ENTERPRISES CORPORATION) or TSU-6U (available from Aimex Co., Ltd.) can be used, for example. Thereafter, carboxyl groups are neutralized with a neutralizer, and the polyurethane resin is dispersed as a salt in an aqueous medium, and the hydrophilic solvent is distilled off as needed.

[C] A pigment is added to, and mixed and homogenized with a polyurethane dispersion containing the polyurethane resin prepared by the method [3] of preparing the polyurethane resin, which is described in this specification. An apparatus for preparing the polyurethane resin can be used as an apparatus used in mixing and homogenizing. In the next step, the aqueous dispersion containing the pigment is mechanically disintegrated into a fine state. As the dispersing machine used in this step, Dyno-Mill (available from SHINMARU ENTERPRISES CORPORATION) or TSU-6U (available from Aimex Co., Ltd.) can be used, for example.

In the methods of preparing the aqueous pigment dispersion, any apparatus can be used for emulsion dispersion in the aqueous medium, and examples thereof include emulsifying machines of types described below:

1) anchor stirring type emulsifying machines, 2) rotor-stator type emulsifying machines [such as "Ebara Milder" (available from EBARA CORPORATION)], 3) line mill type emulsifying machines [such as line flow mixer], 4) static tube mixing type emulsifying machines [such as static mixer], 5) vibration type emulsifying machines [such as "VIBROMIXER" (available from REICA Co., Ltd.)], 6) ultrasonic impact type emulsifying machines [such as ultrasonic homogenizer], 7) high pressure impact type emulsifying machines [such as Gaulin homogenizer (Manton-Gaulin Company)], 8) emulsion type emulsifying machines [such as membrane emulsion modules], and 9) centrifugal thin film contact type emulsifying machines [such as FIL-MIX]. Among these, preferred are anchor stirring type emulsifying machines.

The aqueous pigment dispersion can contain additives such as an emulsifier, a cross-linking agent, a weather stabilizer, and a smoothing agent as needed. These additives may be used alone or in combination. The amount of the additives to be used is preferably 15% by weight or less, more preferably 10% by weight or less, still more preferably 5% by weight or less based on the total weight of the pigment and the polyurethane resin.

According to one aspect, preferably, the aqueous pigment dispersion according to the present invention contains an emulsifier. The aqueous pigment dispersion according to the present invention containing an emulsifier demonstrates more favorable storage stability and dry rubbing fastness after the aqueous pigment dispersion is heated. The emulsifier is preferably added during preparation of the aqueous pigment dispersion.

When the emulsifier is used during preparation of the aqueous pigment dispersion, the emulsifier may be added at any timing in the preparation. According to one aspect, from the viewpoint of dispersibility of the pigment and stability of the aqueous dispersion, the emulsifier is preferably added before or during dispersing the pigment in the polyurethane resin. The emulsifier may be added one or both of the solvent solution of the polyurethane resin and the aqueous medium. When the emulsifier is reactive with the urethane prepolymer, it is preferably added to the aqueous medium. The amount of the emulsifier to be added is preferably 0.2 to 10% by weight, more preferably 0.3 to 6% by weight based on the weight of the pigment.

Examples of the emulsifier include nonionic surfactants, anionic surfactants, cationic surfactants, amphoteric surfactants, and other emulsion dispersants. These emulsifiers may be used alone or in combination. Among these, preferred are nonionic surfactants.

Examples of nonionic surfactants include aliphatic alcohol (8 to 24 carbon atoms) AO (2 to 8 carbon atoms) adducts (degree of polymerization=1 to 100), polyhydric alcohol (3 to 18 carbon atoms) AO (2 to 8 carbon atoms) adducts (degree of polymerization=1 to 100), (poly)oxyalkylene (2 to 8 carbon atoms, degree of polymerization=1 to 100) higher fatty acid (8 to 24 carbon atoms) esters [such as mono- or difatty acid polyethylene glycol esters such as monooleic acid polyethylene glycol esters (HLB=6 to 17), monostearic acid polyethylene glycol esters (HLB=8 to 15), distearic acid polyethylene glycol esters (HLB=8 to 14)], polyvalent (di- to deca- or higher valent) alcohol fatty acid (8 to 24 carbon atoms) esters [such as glycerol monostearate, ethylene glycol monostearate, and fatty acid sorbitan esters (sorbitan monooleate and sorbitan monolaurate)], (poly)oxyalkylene (2 to 8 carbon atoms, degree of polymerization=1 to 100) polyvalent (di- to deca- or higher valent) alcohol higher fatty acid (8 to 24 carbon atoms) esters [such as polyoxyethylene sorbitan monolaurate (HLB=10 to 16), polyoxyethylene methyl glucoside dioleate (HLB=17)], fatty acid alkanolamides [such as 1:1 type coconut oil fatty acid diethanolamide, 1:1 type lauric acid diethanolamide], (poly)oxyalkylene (2 to 8 carbon atoms, degree of polymerization=1 to 100) alkyl (1 to 22 carbon atoms) phenyl ethers, (poly)oxyalkylenes (2 to 8 carbon atoms, degree of polymerization=1 to 100) alkyl (8 to 24 carbon atoms) aminoethers, and alkyl (8 to 24 carbon atoms) dialkyl(1 to 6 carbon atoms) amine oxides [such as lauryl dimethyl amine oxide].

Among these, preferred are aliphatic alcohol (8 to 24 carbon atoms) AO (2 to 8 carbon atoms) adducts (HLB=5 to 18), polyhydric alcohol (3 to 18 carbon atoms) AO (2 to 8 carbon atoms) adducts (HLB=11 to 24), sorbitan monooleate, and mono- or difatty acid polyethylene glycol esters such as monooleic acid polyethylene glycol esters (HLB=6 to 17), monostearic acid polyethylene glycol ester (HLB=8 to 15), and distearic acid polyethylene glycol esters (HLB=8 to 14).

According to one aspect, because of high dry rubbing fastness and high stability under heating, the aqueous pigment dispersion according to the present invention preferably contains a nonionic surfactant. Preferred nonionic surfactants are aliphatic alcohol (8 to 24 carbon atoms) AO (2 to 8 carbon atoms) adducts (HLB=5 to 18), polyhydric alcohol (3 to 18 carbon atoms) AO (2 to 8 carbon atoms) adducts (HLB=11 to 24), monooleic acid sorbitan, and monooleic acid polyethylene glycol esters (HLB=6 to 17).

Examples of anionic surfactants include ether carboxylic acids having a hydrocarbon group having 8 to 24 carbon atoms or salts thereof [such as sodium lauryl ether acetate and (poly)oxyethylene (the number of moles of EC to be added: 1 to 100) sodium lauryl ether acetate]; sulfuric acid esters or ether sulfuric acid esters having a hydrocarbon group having 8 to 24 carbon atoms and salts thereof [such as sodium lauryl sulfate, sodium (poly)oxyethylene (the number of moles of EC to be added: 1 to 100) lauryl sulfate, (poly)oxyethylene (the number of moles of EC to be added: 1 to 100) lauryl sulfuric acid triethanolamine, and (poly)oxyethylene (the number of moles of EC to be added: 1 to 100) coconut oil fatty acid monoethanolamide sodium sulfate]; sulfonates having a hydrocarbon group having 8 to 24 carbon atoms [such as sodium dodecylbenzenesulfonate]; sulfosuccinic acid salts having one or two hydrocarbon groups having 8 to 24 carbon atoms; phosphoric acid esters or ether phosphoric acid esters having a hydrocarbon group having 8 to 24 carbon atoms and salts thereof [such as sodium lauryl phosphate and (poly)oxyethylene (the number of moles of EC to be added: 1 to 100) sodium lauryl ether phosphate]; fatty acid salts having a hydrocarbon group having 8 to 24 carbon atoms [such as sodium laurate and triethanolamine laurate]; and acylated amino acid salts such as hydrocarbon group having 8 to 24 carbon atoms [such as coconut oil fatty acid methyl taurine sodium, coconut oil fatty acid sarcosine sodium, coconut oil fatty acid sarcosine triethanolamine, N-coconut oil fatty acid acyl-L-glutamic acid triethanolamine, N-coconut oil fatty acid acyl-L-glutamic acid sodium, and lauroyl methyl-β-alanine sodium].

Examples of cationic surfactants include quaternary ammonium salt type cationic surfactants [such as stearyltrimethylammonium chloride, behenyltrimethylammonium chloride, distearyldimethylammonium chloride, and lanolin fatty acid aminopropyl ethyl dimethyl ammonium ethylsulfate], and amine salt type cationic surfactants [such as lactic acid salt of diethylaminoethyl stearamide, dilaurylamine hydrochloride, and oleylamine lactate].

Examples of amphoteric surfactants include betaine type amphoteric surfactants [such as coconut oil fatty acid amide propyl dimethylamino acetic acid betaine, lauryl dimethylamino acetic acid betaine, 2-alkyl-N-carboxymethyl-N-hydroxyethyl imidazolinium betaine, lauryl hydroxy sulfobetaine, and sodium lauroyl amideethyl hydroxyethyl carboxymethyl betaine hydroxypropyl phosphate], and amino acid type amphoteric surfactants [such as sodium β-lauryl aminopropionate].

Examples of other emulsion dispersants include polyvinyl alcohol, starch and derivatives thereof, cellulose derivatives such as carboxymethyl cellulose, methyl cellulose, and hydroxyethyl cellulose, carboxyl group-containing (co)polymers such as sodium polyacrylate, and emulsion dispersants having a urethane or ester group described in U.S. Pat. No. 5,906,704 [such as a compound of a polylactone polyol and a polyether polyol linked with a polyisocyanate].

When the aqueous pigment dispersion contains the emulsifier, the content is preferably 0.2 to 10% by weight, more preferably 0.3 to 6% by weight based on the weight of the polyurethane resin.

Using the prepared aqueous pigment dispersion, an inkjet ink composition having high rubbing fastness and demonstrating high color developability can be obtained.

Other components appropriately selected can be added to the aqueous pigment dispersion or inkjet ink according to the present invention as needed. Examples thereof include dispersants, penetrating agents, pH adjusters, water-dispersible resins, antiseptic and antifungal agents, chelate reagents, rust inhibitors, antioxidants, ultraviolet absorbing agents, oxygen absorbers, and light stabilizers.

<Aqueous Inkjet Ink>

According to one aspect, the inkjet ink contains the aqueous pigment dispersion according to the present invention, water, and optionally a water-soluble organic solvent.

According to one aspect, the blending amount of the aqueous pigment dispersion in the inkjet ink is preferably 20 to 80% by weight, more preferably 30 to 70% by weight or more, still more preferably 40 to 60% by weight or more relative to the total amount of the ink.

According to one aspect, the total weight of the pigment and the polyurethane resin in the inkjet ink is preferably 5 to 20% by weight, more preferably 10 to 15% by weight relative to the total amount of the ink from the viewpoint of storage stability.

According to one aspect, the weight of water in the inkjet ink is preferably 50 to 80% by weight, more preferably 60 to 75% by weight relative to the total amount of the ink.

(Water-Soluble Organic Solvent)

When the medium for the inkjet ink is water, a water-soluble organic solvent can be contained to prevent drying of the ink or improve the dispersion stability of the pigment. Any water-soluble organic solvent can be used, and can be appropriately selected according to the purpose.

To moisturize the nozzle of an inkjet recording apparatus and optimize the viscosity, the water-soluble organic solvent preferably contains a water-soluble solvent having a normal boiling point (hereinafter, also simply referred to as "bp") of 180° C. or more (hereinafter, also referred to as "high-boiling point organic solvent").

The term "normal boiling point" indicates a boiling point at an atmospheric pressure of 0.101 MPa. High-boiling point organic solvents may be used alone or in combination.

The content of the high-boiling point organic solvent is preferably 1 to 40% by weight, more preferably 5 to 30% by weight, still more preferably 10 to 25% by weight relative to the total amount of the ink.

The water-soluble organic solvent is preferably a polyhydric alcohol. The polyhydric alcohol can be any polyhydric alcohol, which can be appropriately selected as the water-soluble organic solvent according to the purpose. Examples thereof include propylene glycol (bp of 188° C.), dipropylene glycol (bp of 232° C.), 1,5-pentanediol (bp of 242° C.), 3-methyl-1,3-butanediol (bp of 203° C.), 2-methyl-2,4-pentanediol (bp of 197° C.), ethylene glycol (bp of 196° C. to 198° C.), tripropylene glycol (bp of 267° C.), hexylene glycol (bp of 197° C.), 1,6-hexanediol (bp of 253° C. to 260° C.), 1,2-hexanediol (bp of 170° C.), 1,2,6-hexanetriol (bp of 178° C.), 1,2,3-butanetriol, 1,2,4-butanetriol (bp of 190° C. to 191° C./24 hPa), glycerol (bp of 290° C.), diglycerol (bp of 270° C./20 hPa), triethylene glycol (bp of 285° C.), tetraethylene glycol (bp of 324 to 330° C.), diethylene glycol (bp of 245° C.), 1,3-butanediol (bp of 203° C. to 204° C.), and polypropylene glycol (bp of 187° C.)

Other than the water-soluble organic solvent, a different water-soluble organic solvent or a solid wetting agent can be used in combination in the ink as needed, instead of part of these water-soluble organic solvent or in addition to these water-soluble organic solvents.

Examples of the different water-soluble organic solvent or solid wetting agent include polyhydric alcohols, polyhydric alcohol alkylethers, polyhydric alcohol aryl ethers, nitrogen-containing heterocyclic compounds, amides, amines, sulfur-containing compounds, propylene carbonate, ethylene carbonate, and other water-soluble organic solvents.

Examples of the polyhydric alcohols include polyethylene glycol (viscous liquid to solid), trimethylolethane (solid, mp of 199° C. to 201° C.), and trimethylolpropane (solid, mp of 61° C.)

Examples of the polyhydric alcohol alkylethers include ethylene glycol monoethyl ether (bp of 135° C.), ethylene glycol monobutyl ether (bp of 171° C.), diethylene glycol monomethyl ether (bp of 194° C.), diethylene glycol monobutyl ether (bp of 231° C.), ethylene glycol mono-2-ethylhexyl ether (bp of 229° C.), and propylene glycol monoethyl ether (bp of 132° C.)

The ink can contain the water-soluble organic solvent in any amount, which can be appropriately selected according to the purpose. The content is preferably 1 to 50% by weight.
(Surfactant)

The inkjet ink prepared using the aqueous pigment dispersion according to the present invention preferably contains a surfactant. If the surfactant is contained, ejection properties of the ink can be improved, and wetting and spreading properties can be improved, providing favorable image quality (color developability).

Examples of the surfactant include nonionic surfactants, anionic surfactants, cationic surfactants, amphoteric surfactants, and other emulsion dispersants. These surfactants may be used alone or in combination. Among these, preferred are nonionic surfactants. Examples of the nonionic surfactants, the anionic surfactants, the cationic surfactants, and the amphoteric surfactants are as listed above.

Preferably, the ink contains a nonionic surfactant as the surfactant. When the ink contains the nonionic surfactant, ejection properties of the ink and wetting and spreading properties can be improved, providing favorable image quality (color developability).

Preferably, as the surfactant, the ink contains an alkylether type nonionic surfactant having an HLB of 5 to 12. When the ink contains the surfactant, ejection properties of the ink and wetting and spreading properties can be improved, providing favorable image quality (color developability). In the present embodiment, the HLB indicates a value determined by a Griffin method.

The content of the surfactant is 0.01 to 10% by weight, more preferably 0.05 to 5% by weight, still more preferably 0.1 to 3% by weight relative to the total amount of the ink.

The ink prepared using the aqueous pigment dispersion according to the present invention has a viscosity at 25° C. of preferably 3.0 to 10.0 mPa·s, more preferably 3.5 to 6.0 mPa·s. The viscosity can be measured using a cone plate viscometer according to conditions specified in Examples.

The inkjet ink containing the aqueous pigment dispersion according to the present invention can be suitably used as inkjet ink for coated paper for printing, inkjet ink for cardboard, and inkjet ink for cotton fabrics, for example. Examples of printing methods using the inkjet ink include, but is not limited to, printing at home, printing in business, sign graphic printing, and printing by pigment printing. Preferably, examples thereof include printing by pigment printing.

EXAMPLES

Hereinafter, the present invention will be described in detail by way of Examples, but these is not construed as limitations to the present invention. Hereinafter, "parts" indicates parts by weight unless otherwise specified.

Production Example 1

67.1 parts of polycarbonate polyol [ETERNACOLL UH-200 available from UBE Corporation], 0.5 parts of 1,4-butanediol, 4.9 parts of 2,2-dimethylolpropionic acid (DMPA) as a polyol component having a side chain having a carboxyl group, 27.5 parts of dicyclohexylmethane-4,4-diisocyanate (hydrogenated MDI) as an organic polyisocyanate component, and 100 parts of tetrahydrofuran as an organic solvent for a reaction were placed into a pressure-resistant reaction container provided with a stirrer and a heater, and were urethanized by stirring at 70° C. for 12 hours to prepare a solvent solution of a polyurethane resin (P-1) having an isocyanate group.

Production Examples 2 to 7

Solvent solutions of polyurethane resins (P-2) to (P-7) were prepared in the same manner as in Production Example 1 except that the raw materials used and the amounts thereof were varied as in Tables 1-1 to 1-2.

Production Example 8

30 parts of the solvent solution of the polyurethane resin (P-2) prepared in Production Example 2 and 0.54 parts of triethylamine as a neutralizer were added to a vessel provided with a stirrer, and were homogenized. Thereafter, 83.8 parts of water was added with stirring at 200 rpm to disperse the mixture. 0.64 parts of isophoronediamine (IPDA) as a chain extender was added to the resulting dispersion under stirring to perform an extension reaction for 30 minutes, and tetrahydrofuran was distilled off under reduced pressure at 60° C. over 2 hours. Water was added to adjust the solid concentration to 16.7% by weight. Thus, a dispersion of a polyurethane resin (P-8) was prepared.

Production Examples 9 to 11

Solvent solutions of polyurethane resins (P-9) to (P-11) were prepared in the same manner as in Production Example 1 except that the raw materials used and the amounts thereof were varied as in Tables 1-2 to 1-3.

Production Example 12

57 parts of myristyl alcohol and 0.08 parts of potassium hydroxide were placed into a pressure-resistant reaction container provided with a thermometer, a heating and cooling apparatus, a stirrer, and a cylinder for dropwise addition, followed by purging with nitrogen. Thereafter, the container was sealed, and heated to 140° C. While the pressure was being controlled to 0.5 MPa or less at 140° C. under stirring, 43 parts of ethylene oxide was added dropwise over 5 hours, and was aged at the same temperature for 3 hours to prepare an ethylene oxide 4 mol adduct (O-1) of myristyl alcohol.

Production Example 13

36 parts of oleyl alcohol and 0.08 parts of potassium hydroxide were placed into a reaction container similar to that in Production Example 12, followed by purging with nitrogen. Thereafter, the container was sealed, and heated to 140° C. While the pressure was being controlled to 0.5 MPa or less at 140° C. under stirring, 64 parts of ethylene oxide was added dropwise over 5 hours, and was aged at the same temperature for 3 hours to prepare an ethylene oxide 11 mol adduct (O-2) of oleyl alcohol.

Production Example 14

15 parts of sorbitol and 0.08 parts of potassium hydroxide were placed into a reaction container similar to that in Production Example 12, followed by purging with nitrogen. Thereafter, the container was sealed, and heated to 140° C. While the pressure was being controlled to 0.5 MPa or less at 140° C. under stirring, 85 parts of ethylene oxide was added dropwise over 5 hours, and was aged at the same temperature for 3 hours to prepare an ethylene oxide 24 mol adduct (O-3) of sorbitol.

Production Example 15

39 parts of sorbitol, 61 parts of oleic acid, and 50 parts of xylene as a solvent were placed into a reaction tank provided with a cooling tube, a thermometer, a stirrer, and a nitrogen inlet pipe, and were reacted at 180° C. for 3 hours under a nitrogen stream while generated water was distilled off. When the acid value (mgKOH/g) reached less than 1, the pressure of the reaction system was reduced to remove xylene. Thus, an esterified product (O-4) of sorbitol and oleic acid was prepared.

Production Example 16

68 parts of polyoxyethylene monomethyl ether (available from Sigma-Aldrich Corporation, Mn: 550), 32 parts of oleic acid, and 50 parts of xylene as a solvent were placed into a reaction tank provided with a cooling tube, a thermometer, a stirrer, and a nitrogen inlet pipe, and were reacted at 180° C. for 3 hours under a nitrogen stream while generated water was distilled off. When the acid value (mgKOH/g) reached less than 1, the pressure of the reaction system was reduced to remove xylene. Thus, an oleic acid polyethylene glycol ester (O-5) was prepared.

Production Example 17

44 parts of polyoxyethylene monomethyl ether (Polyethylene glycol monomethyl ether 220 available from KANTO CHEMICAL CO., INC., Mn: 220), 56 parts of oleic acid, and 50 parts of xylene as a solvent were placed into a reaction tank provided with a cooling tube, a thermometer, a stirrer, and a nitrogen inlet pipe, and were reacted at 180° C. for 3 hours under a nitrogen stream while generated water was distilled off. When the acid value (mgKOH/g) reached less than 1, the pressure of the reaction system was reduced to remove xylene. Thus, an oleic acid polyethylene glycol ester (O-6) was prepared.

Comparative Production Example 1

Solvent solution of polyurethane resin (P'-1) was prepared in the same manner as in Production Example 1 except that the raw materials used and the amounts thereof were varied as shown in Table 1-3.

Comparative Production Example 2

49.8 parts of butanediol, 69.7 parts of adipic acid, and 0.05 parts of dibutyltin oxide were placed into a reaction tank provided with a cooling tube, a thermometer, a stirrer, and a nitrogen inlet pipe, and were reacted for 3 hours at 200° C. under a nitrogen stream while water generated was being distilled off. These were further reacted under a reduced pressure of 0.5 to 2.5 kPa at 200° C. for 6 hours. When the acid value (mgKOH/g) reached less than 1, the reaction product was extracted from the reaction tank. A polyester polyol having a hydroxyl value (mgKOH/g) of 56.1 was prepared.

Furthermore, 100.0 parts of polyester polyol, 4.2 parts of 1,4-butanediol, 8.8 parts of 2,2-dimethylolpropionic acid (DMPA) as a polyol component having a side chain having a carboxyl group, 28.1 parts of tolylene diisocyanate (TDI) as a polyisocyanate component, and 94.1 parts of acetone as an organic solvent for a reaction were placed into a pressure-resistant reaction container provided with a stirrer and a heater, and were urethanized by stirring at 70° C. for 12 hours. After it was verified that the amount (% by weight) of isocyanate reached 0.1% by weight or less, 0.4 parts of normal butanol was added, followed by a reaction for another two hours to prepare an acetone solution of a urethane resin terminated with a hydroxyl group terminal and having a solid concentration of 60% by mass.

6.7 parts of triethylamine as a neutralizer was added to the resulting acetone solution of the urethane resin, and was homogenized. Thereafter, 710 parts of water was added with stirring at 200 rpm to disperse the mixture. Acetone was distilled off under reduced pressure at 60° C. over 2 hours. Water was added to adjust the solid concentration to 23% by weight. Thus, a dispersion of a polyurethane resin (P'-2) was prepared.

The compositions and physical properties value of the polyurethane resins are shown in Tables 1-1 to 1-3.

TABLE 1-1

|  |  |  |  | Production Example 1 P-1 | Production Example 2 P-2 | Production Example 3 P-3 | Production Example 4 P-4 | Production Example 5 P-5 |
|---|---|---|---|---|---|---|---|---|
| Materials for polyurethane resin charged (parts by weight) | a1 | Crystalline | Polycarbonate polyol, ETERNACOLL UH-200, UBE Corporation, Ltd. | 67.1 | — | — | 63.8 | 74.3 |
|  |  |  | Polycarbonate polyol, ETERNACOLL UC-100, UBE Corporation, Ltd. | — | 53.9 | — | — | — |
|  |  |  | Polycarbonate polyol, BENEBiOL NL2010DB, Mitsubishi Chemical Corporation | — | — | 70.4 | — | — |
|  |  | Non-crystalline | Polycarbonate polyol, DURANOL T5651, Asahi Kasei Chemicals Corp. | — | — | — | — | — |
|  |  | Polyol other than (a1) | Polycaprolactone polyol Daicel Corporation PCL210 | — | — | — | — | — |
|  |  |  | Polycaprolactone polyol Daicel Corporation PCL312 | — | — | — | — | — |
|  |  |  | Copolymerized product of polyester polyol, adipic acid, and butanediol | — | — | — | — | — |
|  |  | Polyol having hydrophilic group | 1,4-Butanediol | 0.5 | 1.6 | 0.6 | 0.6 | 0.3 |
|  |  |  | 2,2-Dimethylol propionic acid (DMPA) | 4.9 | 4.9 | 3.6 | 7.2 | 2.5 |
|  | b1 |  | Hydrogenated MDI (b1) | 27.5 | 39.6 | 25.4 | — | 22.9 |
|  | b2 |  | IPDI (b2) | — | — | — | 28.5 | — |
|  |  |  | Norbornene methane diisocyanate, Mitsui Fine Chemicals, Inc. | — | — | — | — | — |
|  | b3 |  | TDI (b3) | — | — | — | — | — |
|  | THF |  |  | 100 | 100 | 100 | 100 | 100 |
|  | Acetone |  |  | — | — | — | — | — |
|  | Triethylamine |  |  | — | — | — | — | — |
|  | Isophoronediamine |  |  | — | — | — | — | — |
|  | Water |  |  | — | — | — | — | — |
| Acid value (mgKOH/g) |  |  |  | 20 | 20 | 15 | 30 | 10 |
| Urethane group content (mol/kg) |  |  |  | 1.5 | 1.5 | 1.4 | 1.8 | 1.1 |

TABLE 1-2

|  |  |  |  | Production Example 6 P-6 | Production Example 7 P-7 | Production Example 8 P-8 | Production Example 9 P-9 |
|---|---|---|---|---|---|---|---|
| Materials for polyurethane resin charged (parts by weight) | a1 | Crystalline | Polycarbonate polyol, ETERNACOLL UH-200, UBE Corporation, Ltd. | 53.9 | 64.9 | — | 40.4 |
|  |  |  | Polycarbonate polyol, ETERNACOLL UC-100, UBE Corporation, Ltd. | — | — | 8.1 | — |
|  |  |  | Polycarbonate polyol, BENEBiOL NL2010DB, Mitsubishi Chemical Corporation | — | — | — | — |
|  |  | Non-crystalline | Polycarbonate polyol, DURANOL T5651, Asahi Kasei Chemicals Corp. | — | — | — | — |
|  |  | Polyol other than (a1) | Polycaprolactone polyol Daicel Corporation PCL210 | — | — | — | — |
|  |  |  | Polycaprolactone polyol Daicel — PCL312 | — | — | — | — |
|  |  |  | Copolymerized product of polyester polyol, adipic acid, and butanediol | — | — | — | — |
|  |  | Polyol having hydrophilic group | 1,4-Butanediol | 0.4 | 4.3 | 0.3 | 6.6 |
|  |  |  | 2,2-Dimethylol propionic acid (DMPA) | 9.0 | 4.9 | 0.8 | 4.9 |
|  | b1 |  | Hydrogenated MDI (b1) | 36.1 | 4.1 | 5.8 | 47.1 |
|  | b2 |  | IPDI (b2) | — | — | — | — |
|  |  |  | Norbornene methane diisocyanate, Mitsui Fine Chemicals, Inc. | — | — | — | — |
|  | b3 |  | TDI (b3) | — | 21.8 | — | — |
|  | THF |  |  | 100 | 100 | 15 | — |
|  | Acetone |  |  | — | — | — | 100 |
|  | Triethylamine |  |  | — | — | 0.54 | — |
|  | Isophoronediamine |  |  | — | — | 0.64 | — |
|  | Water |  |  | — | — | 83.8 | — |
| Acid value (mgKOH/g) |  |  |  | 38 | 20 | 20 | 20 |
| Urethane group content (mol/kg) |  |  |  | 2.3 | 2.3 | 1.5 | 2.6 |

TABLE 1-3

| | | | Production Example 10 P-10 | Production Example 11 P-11 | Comparative Production Example 1 P'-1 | Comparative Production Example 2 P'-2 |
|---|---|---|---|---|---|---|
| Materials for polyurethane resin charged (parts by weight) | a1 Crystalline | Polycarbonate polyol, ETERNACOLL UH-200, UBE Corporation, Ltd. | — | 29.1 | — | — |
| | | Polycarbonate polyol, ETERNACOLL UC-100, UBE Corporation, Ltd. | — | — | — | — |
| | | Polycarbonate polyol, BENEBiOL NL2010DB, Mitsubishi Chemical Corporation | — | — | — | — |
| | Non-crystalline | Polycarbonate polyol, DURANOL T5651, Asahi Kasei Chemicals Corp. | 59.1 | — | — | — |
| | Polyol other than (a1) | Polycaprolactone polyol Daicel Corporation PCL210 | — | — | 32.2 | — |
| | | Polycaprolactone polyol Daicel Corporation PCL312 | — | — | 32.2 | — |
| | | Copolymerized product of polyester polyol, adipic acid, and butanediol | — | — | — | 100.0 |
| | Polyol having hydrophilic group | 1,4-Butanediol | — | — | — | 4.2 |
| | | 2,2-Dimethylol propionic acid (DMPA) | 5.4 | 14.8 | 3.6 | 8.8 |
| | b1 | Hydrogenated MDI (b1) | — | 56.1 | — | — |
| | b2 | IPDI (b2) | — | — | 32.0 | — |
| | | Norbornene methane diisocyanate, Mitsui Fine Chemicals, Inc. | 35.5 | — | — | — |
| | b3 | TDI (b3) | — | — | — | 28.1 |
| | THF | | — | 100 | — | — |
| | Acetone | | 100 | — | 100 | 94.1 |
| | Triethylamine | | — | — | — | 6.7 |
| | Isophoronediamine | | — | — | — | — |
| | Water | | — | — | — | 710 |
| Acid value (mgKOH/g) | | | 23 | 62 | 15 | 26 |
| Urethane group content (mol/kg) | | | 3.2 | 2.5 | 1.8 | 2.3 |

Example 1

30 parts of the solvent solution of the polyurethane resin (P-1) prepared in Production Example 1 and 27 parts of tetrahydrofuran were added to a vessel in a pigment dispersing machine (TSU-6U, available from Aimex Co., Ltd.), and were stirred until the resin was homogeneously dissolved. Next, 10 parts of a cyan pigment [Heliogen Blue D7088 available from BASF SE] and 140 parts of glass beads [ASGB-320, available from AS ONE Corporation] were added, and then the materials were dispersed for 3 hours while 4° C. cooling water was being passed through the jacket.

0.54 parts of triethylamine as a neutralizer was added to and homogenized with the resulting dispersed slurry. Thereafter, 80 parts of water was added with stirring at 200 rpm to disperse the mixture. 0.64 parts of isophoronediamine (IPDA) as a chain extender was added to the resulting dispersion under stirring to perform an extension reaction for 30 minutes; thereafter, tetrahydrofuran was distilled off under reduced pressure at 60° C. over 2 hours, and the glass beads were removed through a filter. The solid concentration was adjusted to 25% by weight by adding water to prepare an aqueous pigment dispersion (Q-1).

Examples 2 to 24

Aqueous pigment dispersions (Q-2) to (Q-24) were prepared in the same manner as in Example 1 except that the raw materials used and the amounts thereof were varied as shown in Tables 2-1 to 2-3 and 3-1 to 3-3.

In Examples 15 to 24, nonionic surfactants (O-1) to (O-6) were used. When a nonionic surfactant was used, in the beginning of the step shown in Example 1, the nonionic surfactant together with the solvent solution of the polyurethane resin and tetrahydrofuran was added to the vessel of the pigment dispersing machine (TSU-6U, available from Aimex Co., Ltd.), and these were stirred until the resin was homogeneously dissolved.

Example 25

30 parts of the solvent solution of the polyurethane resin (P-2) prepared in Production Example 2, 50 parts of tetrahydrofuran, and 0.5 parts of the oleic acid polyethylene glycol ester (O-6) prepared in Production Example 14 were added to a vessel in a pigment dispersing machine (TSU-6U, available from Aimex Co., Ltd.), and were stirred until the resin was homogeneously dissolved. 1.51 parts of isophoronediamine (IPDA) as a chain extender was added under stirring to perform an extension reaction for 30 minutes. Next, 10 parts of a cyan pigment [Heliogen Blue D7088 available from BASF SE] and 140 parts of glass beads [ASGB-320, available from AS ONE Corporation] were added, and then were dispersed for 3 hours while 4° C. cooling water was being passed through the jacket.

0.54 parts of triethylamine as a neutralizer was added to and homogenized with the resulting dispersed slurry. Thereafter, 80 parts of water was added with stirring at 200 rpm to disperse the mixture. Tetrahydrofuran was distilled off under reduced pressure at 60° C. over 2 hours, and glass beads were removed with a filter. Water was added to adjust the solid concentration to 25% by weight. Thus, an aqueous pigment dispersion (Q-25) was prepared.

Example 26

90 parts of the dispersion of the polyurethane resin (P-8) prepared in Production Example 8, 0.5 parts of the oleic acid polyethylene glycol ester (O-6) prepared in Production Example 14, 10 parts of a cyan pigment [Heliogen Blue D7088 available from BASF SE], and 140 parts of glass beads [ASGB-320, available from AS ONE Corporation] were added to a vessel in a pigment dispersing machine (TSU-6U, available from Aimex Co., Ltd.), and were dispersed for 3 hours while 4° C. cooling water was being passed through the jacket. Next, the glass beads were removed through a filter. The solid concentration was adjusted to 25% by weight by adding water to prepare an aqueous pigment dispersion (Q-26).

Comparative Examples 1 to 5

Aqueous pigment dispersions (Q'-1) to (Q'-5) were prepared in the same manner as in Example 1 except that the raw materials used and the amounts thereof were varied as shown in Tables 4-1 to 4-2.

Comparative Example 6

19.6 parts of the dispersion of the polyurethane resin (P'-2) prepared in Comparative Production Example 2, 15 parts of a cyan pigment [Heliogen Blue D7088 available from BASF SE], 65.4 parts of water, and 300 parts of glass beads [ASGB-320, available from AS ONE Corporation] were added to a vessel of a pigment dispersing machine (TSU-6U, available from Aimex Co., Ltd.), and were dispersed for 6 hours while 4° C. cooling water was being passed through a jacket. In the next step, glass beads were removed with a filter, and the filtrate was formed into a fine state for 3 hours using an ultrasonic homogenizer at an output of 600 W. Water was added to adjust the solid concentration to 25% by weight. Thus, an aqueous pigment dispersion (Q'-6) was prepared.

For the aqueous pigment dispersions prepared in Examples and Comparative Examples, the amounts (parts) of the materials blended, values indicating physical properties, and the results of evaluation are shown in Tables 2-1 to 2-3, 3-1 to 3-3 and 4-1 to 4-2.

TABLE 2-1

| | | | Example 1 | Example 2 | Example 3 | Example 4 | Example 5 |
|---|---|---|---|---|---|---|---|
| | | Aqueous pigment dispersion (Q) | Q-1 | Q-2 | Q-3 | Q-4 | Q-5 |
| | | Ink (R) | R-1 | R-2 | R-3 | R-4 | R-5 |
| | | Dry coating film (U) of aqueous pigment dis persion | U-1 | U-2 | U-3 | U-4 | U-5 |
| Materials for aqueous pigment dispersion charged (parts by weight) | Pigment | Cyan pigment BASF Heliogen Blue D 7088 | 10 | 10 | 10 | 10 | 10 |
| | | Magenta pigment BASF Cinquasia Magenta_D_4550J | — | — | — | — | — |
| | | Yellow pigment BASF Palitol Yellow D 1115J | — | — | — | — | — |
| | | Black pigment Orion Engineered Carbons NIPEX_160IQ | — | — | — | — | — |
| | | White pigment Sakai Chemical Industry Co., Ltd. R21 | — | — | — | — | — |
| | Solvent solution or dispersion of urethane resin (P) | (P-1) | 30 | — | — | — | — |
| | | (P-2) | — | 30 | — | — | — |
| | | (P-3) | — | — | 30 | — | — |
| | | (P-4) | — | — | — | 30 | — |
| | | (P-5) | — | — | — | — | 30 |
| | | (P-6) | — | — | — | — | — |
| | | (P-7) | — | — | — | — | — |
| | | (P-8) | — | — | — | — | — |
| | | (P-9) | — | — | — | — | — |
| | | (P-10) | — | — | — | — | — |
| | | (P-11) | — | — | — | — | — |
| | | (P'-1) | — | — | — | — | — |
| | | (P'-2) | — | — | — | — | — |
| | Solvent | Tetrahydrofuran | 27 | 27 | 27 | 27 | 27 |
| | Neutralizer | Triethylamine | 0.54 | 0.54 | 0.54 | 0.54 | 0.27 |
| | | KOH 30 wt % water | — | — | — | — | — |
| | Chain extender | Isophoronediamine | 0.64 | 0.64 | 0.64 | 0.64 | 0.64 |
| | | Diethylenetriamine | — | — | — | — | — |
| | Nonionic surfactant | (O-1) | — | — | — | — | — |
| | | (O-2) | — | — | — | — | — |
| | | (O-3) | — | — | — | — | — |
| | | (O-4) | — | — | — | — | — |
| | | (O-5) | — | — | — | — | — |
| | | (O-6) | — | — | — | — | — |
| | | Water | 80 | 80 | 80 | 80 | 80 |
| Physical properties of aqueous pigment dispersion | | Cumulant average particle size (nm) | 160 | 165 | 178 | 151 | 181 |
| | | Molecular weight (Mw) of resin | 113500 | 99400 | 95600 | 108500 | 89900 |
| | | Storage modulus G' (MPa) at 160° C. | 2.5 | 1.9 | 2.2 | 2.8 | 1.5 |
| Initial dis persibility of ink | | Cumulant average particle size (nm) | 165 | 162 | 175 | 155 | 179 |
| | | Ranking of particle size | Good | Good | Good | Good | Good |
| | | Viscosity (mPa · s) | 4.2 | 4.1 | 4.7 | 5.1 | 3.9 |
| | | Ranking of viscosity | Good | Good | Good | Good | Good |
| | | Ranking of initial dispersibility | Good | Good | Good | Good | Good |

TABLE 2-1-continued

|  |  | Example 1 | Example 2 | Example 3 | Example 4 | Example 5 |
|---|---|---|---|---|---|---|
| Storage stability of ink after stored at 60° C. 5 days | Rate of change (%) of particle size | 1.2 | −2.5 | −2.3 | 3.9 | 7.8 |
|  | Ranking of rate of change of particle size | Good | Good | Good | Good | Good |
|  | Rate of change (%) of viscosity | −2.4 | 4.9 | 2.1 | 7.8 | −0.3 |
|  | Ranking of rate of change of viscosity | Good | Good | Good | Good | Good |
|  | Ranking of storage stability | Good | Good | Good | Good | Good |
| Rubbing fastness (cotton fabric) | Dry rubbing fastness | Excellent | Good | Excellent | Good | Good |
|  | Wet rubbing fastness | Excellent | Good | Excellent | Good | Good |
| Color developability in cotton fabric |  | Good | Good | Good | Good | Good |
| Filtration properties after heating |  | Good | Good | Good | Good | Good |
| Test of continuous printing properties |  | Good | Excellent | Good | Good | Good |

TABLE 2-2

|  |  |  | Example 6 | Example 7 | Example 8 | Example 9 | Example 10 |
|---|---|---|---|---|---|---|---|
|  |  | Aqueous pigment dispersion (Q) | Q-6 | Q-7 | Q-8 | Q-9 | Q-10 |
|  |  | Ink (R) | R-6 | R-7 | R-8 | R-9 | R-10 |
|  |  | Dry coating film (U) of aqueous pigment dispersion | U-6 | U-7 | U-8 | U-9 | U-10 |
| Materials for aqueous pigment dispersion charged (parts by weight) | Pigment | Cyan pigment BASF Heliogen Blue D 7088 | 10 | — | 10 | 10 | 10 |
|  |  | Magenta pigment BASF Cinquasia Magenta_D_4550J | — | — | — | — | — |
|  |  | Yellow pigment BASF Palitol Yellow D 1115J | — | — | — | — | — |
|  |  | Black pigment Orion Engineered Carbons NIPEX_160IQ | — | 10 | — | — | — |
|  |  | White pigment Sakai Chemical Industry Co., Ltd. R21 | — | — | — | — | — |
|  | Solvent solution or dispersion of urethane resin (P) | (P-1) | — | — | 30 | 30 | 30 |
|  |  | (P-2) | — | — | — | — | — |
|  |  | (P-3) | — | — | — | — | — |
|  |  | (P-4) | — | — | — | — | — |
|  |  | (P-5) | — | — | — | — | — |
|  |  | (P-6) | 30 | — | — | — | — |
|  |  | (P-7) | — | 30 | — | — | — |
|  |  | (P-8) | — | — | — | — | — |
|  |  | (P-9) | — | — | — | — | — |
|  |  | (P-10) | — | — | — | — | — |
|  |  | (P-11) | — | — | — | — | — |
|  |  | (P'-1) | — | — | — | — | — |
|  |  | (P'-2) | — | — | — | — | — |
|  | Solvent | Tetrahydrofuran | 27 | 27 | 27 | 27 | 27 |
|  | Neutralizer | Triethylamine | 1.02 | 0.54 | 0.54 | 0.54 | — |
|  |  | KOH 30 wt % water | — | — | — | — | 1.0 |
|  | Chain extender | Isophoronediamine | 0.64 | 0.64 | 1.62 | 0.60 | 0.64 |
|  |  | Diethylenetriamine | — | — | — | — | — |
|  | Nonionic surfactant | (O-1) | — | — | — | — | — |
|  |  | (O-2) | — | — | — | — | — |
|  |  | (O-3) | — | — | — | — | — |
|  |  | (O-4) | — | — | — | — | — |
|  |  | (O-5) | — | — | — | — | — |
|  |  | (O-6) | — | — | — | — | — |
|  |  | Water | 80 | 80 | 80 | 80 | 80 |
| Physical properties of aqueous pigment dispersion | Cumulant average particle size (nm) |  | 149 | 124 | 162 | 168 | 160 |
|  | Molecular weight (Mw) of resin |  | 98600 | 104500 | 35000 | 152000 | 113500 |
|  | Storage modulus G' (MPa) at 160° C. |  | 3.6 | 3.6 | 1.0 | 9.8 | 2.5 |
| Initial dispersibility of ink | Cumulant average particle size (nm) |  | 151 | 129 | 163 | 167 | 159 |
|  | Ranking of particle size |  | Good | Good | Good | Good | Good |
|  | Viscosity (mPa · s) |  | 5.4 | 4.4 | 4.5 | 4.8 | 5.2 |
|  | Ranking of viscosity |  | Good | Good | Good | Good | Good |
|  | Ranking of initial dispersibility |  | Good | Good | Good | Good | Good |
| Storage stability of ink after stored at 60° C. 5 days | Rate of change (%) of particle size |  | 4.6 | 1.6 | −1.2 | 2.4 | 5.0 |
|  | Ranking of rate of change of particle size |  | Good | Good | Good | Good | Good |
|  | Rate of change (%) of viscosity |  | 9.3 | −2.3 | 1.1 | −0.6 | −3.8 |
|  | Ranking of rate of change of viscosity |  | Good | Good | Good | Good | Good |
|  | Ranking of storage stability |  | Good | Good | Good | Good | Good |
| Rubbing fastness (cotton fabric) | Dry rubbing fastness |  | Good | Good | Good | Good | Excellent |
|  | Wet rubbing fastness |  | Good | Good | Good | Good | Good |
| Color developability in cotton fabric |  |  | Good | Good | Good | Good | Good |

TABLE 2-2-continued

|  | Example 6 | Example 7 | Example 8 | Example 9 | Example 10 |
|---|---|---|---|---|---|
| Filtration properties after heating | Good | Good | Good | Good | Good |
| Test of continuous printing properties | Good | Good | Good | Good | Good |

TABLE 2-3

| | | | Example 11 | Example 12 | Example 13 | Example 14 |
|---|---|---|---|---|---|---|
| | | Aqueous pigment dispersion (Q) | Q-11 | Q-12 | Q-13 | Q-14 |
| | | Ink (R) | R-11 | R-12 | R-13 | R-14 |
| | | Dry coating film (U) of aqueous pigment dispersion | U-11 | U-12 | U-13 | U-14 |
| Materials for aqueous pigment dispersion charged (parts by weight) | Pigment | Cyan pigment BASF Heliogen Blue D 7088 | — | — | — | — |
| | | Magenta pigment BASF inquasia_Magenta_D_4550J | 10 | — | — | — |
| | | Yellow pigment BASF Palitol Yellow D 1115J | — | 10 | — | — |
| | | Black pigment Orion Engineered Carbons NIPEX_160IQ | — | — | 10 | — |
| | | White pigment Sakai Chemical Industry Co., Ltd. R21 | — | — | — | 10 |
| | Solvent solution or dispersion of urethane resin (P) | (P-1) | 30 | 30 | 30 | 30 |
| | | (P-2) | — | — | — | — |
| | | (P-3) | — | — | — | — |
| | | (P-4) | — | — | — | — |
| | | (P-5) | — | — | — | — |
| | | (P-6) | — | — | — | — |
| | | (P-7) | — | — | — | — |
| | | (P-8) | — | — | — | — |
| | | (P-9) | — | — | — | — |
| | | (P-10) | — | — | — | — |
| | | (P-11) | — | — | — | — |
| | | (P'-1) | — | — | — | — |
| | | (P'-2) | — | — | — | — |
| | Solvent | Tetrahydrofuran | 27 | 27 | 27 | 27 |
| | Neutralizer | Triethylamine | 0.54 | 0.54 | 0.54 | 0.54 |
| | | KOH 30 wt % water | — | — | — | — |
| | Chain extender | Isophoronediamine | 0.64 | 0.64 | 0.64 | 0.64 |
| | | Diethylenetriamine | — | — | — | — |
| | Nonionic surfactant | (O-1) | — | — | — | — |
| | | (O-2) | — | — | — | — |
| | | (O-3) | — | — | — | — |
| | | (O-4) | — | — | — | — |
| | | (O-5) | — | — | — | — |
| | | (O-6) | — | — | — | — |
| | Water | | 80 | 80 | 80 | 80 |
| Physical properties of aqueous pigment dispersion | Cumulant average particle size (nm) | | 155 | 170 | 158 | 270 |
| | Molecular weight (Mw) of resin | | 113500 | 113500 | 113500 | 113500 |
| | Storage modulus G' (MPa) at 160° C. | | 2.4 | 2.3 | 2.8 | 2.9 |
| Initial dispersibility of ink | Cumulant average particle size (nm) | | 154 | 168 | 155 | 271 |
| | Ranking of particle size | | Good | Good | Good | Good |
| | Viscosity (mPa · s) | | 4.5 | 4.2 | 5.5 | 3.7 |
| | Ranking of viscosity | | Good | Good | Good | Good |
| | Ranking of initial dispersibility | | Good | Good | Good | Good |
| Storage stability of ink after stored at 60° C. 5 days | Rate of change (%) of particle size | | 8.4 | −0.6 | 7.7 | −0.7 |
| | Ranking of rate of change of particle size | | Good | Good | Good | Good |
| | Rate of change (%) of viscosity | | 4.4 | 2.4 | −5.5 | 5.4 |
| | Ranking of rate of change of viscosity | | Good | Good | Good | Good |
| | Ranking of storage stability | | Good | Good | Good | Good |
| Rubbing fastness (cotton fabric) | Dry rubbing fastness | | Excellent | Excellent | Excellent | Excellent |
| | Wet rubbing fastness | | Excellent | Excellent | Excellent | Excellent |
| Color developability in cotton fabric | | | Good | Good | Good | Good |
| Filtration properties after heating | | | Good | Good | Good | Good |
| Test of continuous printing properties | | | Good | Good | Good | Good |

TABLE 3-1

|  |  |  | Example 15 | Example 16 | Example 17 | Example 18 |
|---|---|---|---|---|---|---|
|  |  | Aqueous pigment dispersion (Q) | Q-15 | Q-16 | Q-17 | Q-18 |
|  |  | Ink (R) | R-15 | R-16 | R-17 | R-18 |
|  |  | Dry coating film (U) of aqueous pigment dispersion | U-15 | U-16 | U-17 | U-18 |
| Materials for aqueous pigment dispersion charged (parts by weight) | Pigment | Cyan pigment BASF Heliogen Blue D 7088 | 10 | 10 | 10 | — |
|  |  | Magenta pigment BASF Cinquasia Magenta D 4550J | — | — | — | — |
|  |  | Yellow pigment BASF Palitol Yellow D 1115J | — | — | — | — |
|  |  | Black pigment Orion Engineered Carbons NIPEX_160IQ | — | — | — | 10 |
|  |  | White pigment Sakai Chemical Industry Co., Ltd. R21 | — | — | — | — |
|  | Solvent solution or dispersion of urethane resin (P) | (P-1) | — | — | — | — |
|  |  | (P-2) | — | — | — | — |
|  |  | (P-3) | 30 | 30 | 30 | — |
|  |  | (P-4) | — | — | — | — |
|  |  | (P-5) | — | — | — | — |
|  |  | (P-6) | — | — | — | — |
|  |  | (P-7) | — | — | — | 30 |
|  |  | (P-8) | — | — | — | — |
|  |  | (P-9) | — | — | — | — |
|  |  | (P-10) | — | — | — | — |
|  |  | (P-11) | — | — | — | — |
|  |  | (P'-1) | — | — | — | — |
|  |  | (P'-2) | — | — | — | — |
|  | Solvent | Tetrahydrofuran | 27 | 27 | 27 | 27 |
|  | Neutralizer | Triethylamine | 0.54 | 0.54 | 0.54 | 0.54 |
|  |  | KOH 30 wt % water | — | — | — | — |
|  | Chain extender | Isophoronediamine | 0.64 | 0.64 | 0.64 | 0.64 |
|  |  | Diethylenetriamine | — | — | — | — |
|  | Nonionic surfactant | (O-1) | 0.5 | — | — | — |
|  |  | (O-2) | — | 0.5 | — | — |
|  |  | (O-3) | — | — | 0.5 | — |
|  |  | (O-4) | — | — | — | 0.5 |
|  |  | (O-5) | — | — | — | — |
|  |  | (O-6) | — | — | — | — |
|  | Water |  | 80 | 80 | 80 | 80 |
| Physical properties of aqueous pigment dispersion | Cumulant average particle size (nm) |  | 168 | 165 | 159 | 123 |
|  | Molecular weight (Mw) of resin |  | 95600 | 95600 | 95600 | 104500 |
|  | Storage modulus G' (MPa) at 160° C. |  | 2.3 | 2.1 | 2.3 | 2.4 |
| Initial dispersibility of ink | Cumulant average particle size (nm) |  | 169 | 165 | 155 | 124 |
|  | Ranking of particle size |  | Good | Good | Good | Good |
|  | Viscosity (mPa · s) |  | 4.2 | 4.8 | 4.4 | 3.9 |
|  | Ranking of viscosity |  | Good | Good | Good | Good |
|  | Ranking of initial dispersibility |  | Good | Good | Good | Good |
| Storage stability of ink after stored at 60° C. 5 days | Rate of change (%) of particle size |  | 1.2 | 0.6 | 0.6 | 4.0 |
|  | Ranking of rate of change of particle size |  | Good | Good | Good | Good |
|  | Rate of change (%) of viscosity |  | −2.4 | 2.1 | 2.3 | −0.8 |
|  | Ranking of rate of change of viscosity |  | Good | Good | Good | Good |
|  | Ranking of storage stability |  | Good | Good | Good | Good |
| Rubbing fastness (cotton fabric) | Dry rubbing fastness |  | Excellent | Excellent | Good | Excellent |
|  | Wet rubbing fastness |  | Good | Good | Good | Excellent |
| Color developability in cotton fabric |  |  | Good | Good | Good | Good |
| Filtration properties after heating |  |  | Excellent | Excellent | Excellent | Excellent |
| Test of continuous printing properties |  |  | Good | Good | Good | Good |

TABLE 3-2

|  |  |  | Example 19 | Example 20 | Example 21 | Example 22 |
|---|---|---|---|---|---|---|
|  |  | Aqueous pigment dispersion (Q) | Q-19 | Q-20 | Q-21 | Q-22 |
|  |  | Ink (R) | R-19 | R-20 | R-21 | R-22 |
|  |  | Dry coating film (U) of aqueous pigment dispersion | U-19 | U-20 | U-21 | U-22 |
| Materials for aqueous pigment dispersion charged (parts by weight) | Pigment | Cyan pigment BASF Heliogen Blue D 7088 | 10 | 10 | — | — |
|  |  | Magenta pigment BASF Cinquasia Magenta D 4550J | — | — | 10 | — |
|  |  | Yellow pigment BASF Palitol Yellow D 1115J | — | — | — | 10 |

TABLE 3-2-continued

|  |  |  | Example 19 | Example 20 | Example 21 | Example 22 |
|---|---|---|---|---|---|---|
|  |  | Black pigment Orion Engineered Carbons NIPEX_160IQ | — | — | — | — |
|  |  | White pigment Sakai Chemical Industry Co., Ltd. R21 | — | — | — | — |
|  | Solvent | (P-1) | — | — | — | — |
|  | solution or | (P-2) | — | 30 | 30 | 30 |
|  | dispersion | (P-3) | 30 | — | — | — |
|  | of | (P-4) | — | — | — | — |
|  | urethane | (P-5) | — | — | — | — |
|  | resin (P) | (P-6) | — | — | — | — |
|  |  | (P-7) | — | — | — | — |
|  |  | (P-8) | — | — | — | — |
|  |  | (P-9) | — | — | — | — |
|  |  | (P-10) | — | — | — | — |
|  |  | (P-11) | — | — | — | — |
|  |  | (P'-1) | — | — | — | — |
|  |  | (P'-2) | — | — | — | — |
|  | Solvent | Tetrahydrofuran | 27 | 27 | 27 | 27 |
|  | Neutralizer | Triethylamine | 0.54 | 0.54 | 0.54 | 0.54 |
|  |  | KOH 30 wt % water | — | — | — | — |
|  | Chain | Isophoronediamine | 0.64 | 0.64 | 0.64 | 0.64 |
|  | extender | Diethylenetriamine | — | — | — | — |
|  | Nonionic | (O-1) | — | — | — | — |
|  | surfactant | (O-2) | — | — | — | — |
|  |  | (O-3) | — | — | — | — |
|  |  | (O-4) | — | — | — | — |
|  |  | (O-5) | 0.5 | — | — | — |
|  |  | (O-6) | — | 0.5 | 0.5 | 0.5 |
|  | Water |  | 80 | 80 | 80 | 80 |
| Physical properties of aqueous pigment dispersion | Cumulant average particle size (nm) |  | 170 | 159 | 152 | 165 |
|  | Molecular weight (Mw) of resin |  | 95600 | 95600 | 95600 | 95600 |
|  | Storage modulus G' (MPa) at 160° C. |  | 1.9 | 2.1 | 2.2 | 2.0 |
| Initial dispersibility of ink | Cumulant average particle size (nm) |  | 169 | 162 | 155 | 171 |
|  | Ranking of particle size |  | Good | Good | Good | Good |
|  | Viscosity (mPa · s) |  | 4.8 | 4.5 | 4.8 | 5.1 |
|  | Ranking of viscosity |  | Good | Good | Good | Good |
|  | Ranking of initial dispersibility |  | Good | Good | Good | Good |
| Storage stability of ink after stored at 60° C. 5 days | Rate of change (%) of particle size |  | −1.2 | 0.6 | 1.9 | 4.1 |
|  | Ranking of rate of change of particle size |  | Good | Good | Good | Good |
|  | Rate of change (%) of viscosity |  | 2.1 | −2.0 | 2.3 | −3.9 |
|  | Ranking of rate of change of viscosity |  | Good | Good | Good | Good |
|  | Ranking of storage stability |  | Good | Good | Good | Good |
| Rubbing fastness (cotton fabric) | Dry rubbing fastness |  | Good | Excellent | Excellent | Excellent |
|  | Wet rubbing fastness |  | Excellent | Excellent | Excellent | Excellent |
| Color developability in cotton fabric |  |  | Good | Good | Good | Good |
| Filtration properties after heating |  |  | Excellent | Excellent | Excellent | Excellent |
| Test of continuous printing properties |  |  | Good | Excellent | Excellent | Excellent |

TABLE 3-3

|  |  |  | Example 23 | Example 24 | Example 25 | Example 26 |
|---|---|---|---|---|---|---|
|  |  | Aqueous pigment dispersion (Q) | Q-23 | Q-24 | Q-25 | Q-26 |
|  |  | Ink (R) | R-23 | R-24 | R-25 | R-26 |
|  |  | Dry coating film (U) of aqueous pigment dispersion | U-23 | U-24 | U-25 | U-26 |
| Materials for aqueous pigment dispersion charged (parts by weight) | Pigment | Cyan pigment BASF Heliogen Blue D 7088 | — | — | 10 | 10 |
|  |  | Magenta pigment BASF Cinquasia Magenta_D_4550J | — | — | — | — |
|  |  | Yellow pigment BASF Palitol Yellow D 1115J | — | — | — | — |
|  |  | Black pigment Orion Engineered Carbons NIPEX_160IQ | 10 | — | — | — |
|  |  | White pigment Sakai Chemical Industry Co., Ltd. R21 | — | 10 | — | — |
|  | Solvent | (P-1) | — | — | — | — |
|  | solution or | (P-2) | 30 | 30 | 30 | — |

TABLE 3-3-continued

|  |  |  | Example 23 | Example 24 | Example 25 | Example 26 |
|---|---|---|---|---|---|---|
|  | dispersion of urethane resin (P) | (P-3) | — | — | — | — |
|  |  | (P-4) | — | — | — | — |
|  |  | (P-5) | — | — | — | — |
|  |  | (P-6) | — | — | — | — |
|  |  | (P-7) | — | — | — | — |
|  |  | (P-8) | — | — | — | 90 |
|  |  | (P-9) | — | — | — | — |
|  |  | (P-10) | — | — | — | — |
|  |  | (P-11) | — | — | — | — |
|  |  | (P'-1) | — | — | — | — |
|  |  | (P'-2) | — | — | — | — |
|  | Solvent | Tetrahydrofuran | 27 | 27 | 50 | — |
|  | Neutralizer | Triethylamine | 0.54 | 0.54 | 0.54 | — |
|  |  | KOH 30 wt % water | — | — | — | — |
|  | Chain extender | Isophoronediamine | 0.64 | 0.64 | 1.51 | — |
|  |  | Diethylenetriamine | — | — | — | — |
|  | Nonionic surfactant | (O-1) | — | — | — | — |
|  |  | (O-2) | — | — | — | — |
|  |  | (O-3) | — | — | — | — |
|  |  | (O-4) | — | — | — | — |
|  |  | (O-5) | — | — | — | — |
|  |  | (O-6) | 0.5 | 0.5 | 0.5 | 0.5 |
|  | Water |  | 80 | 00 | 80 | — |
| Physical properties of aqueous pigment dispersion | Cumulant average particle size (nm) |  | 120 | 275 | 165 | 172 |
|  | Molecular weight (Mw) of resin |  | 95600 | 95600 | 40600 | 97800 |
|  | Storage modulus G' (MPa) at 160° C. |  | 1.8 | 2.1 | 1.1 | 2.3 |
| Initial dispersibility of ink | Cumulant average particle size (nm) |  | 131 | 274 | 161 | 175 |
|  | Ranking of particle size |  | Good | Good | Good | Good |
|  | Viscosity (mPa · s) |  | 4.1 | 3.5 | 5.1 | 4.4 |
|  | Ranking of viscosity |  | Good | Good | Good | Good |
|  | Ranking of initial dispersibility |  | Good | Good | Good | Good |
| Storage stability of ink after stored at 60° C. 5 days | Rate of change (%) of particle size |  | −1.5 | −1.8 | 5.0 | −1.1 |
|  | Ranking of rate of change of particle size |  | Good | Good | Good | Good |
|  | Rate of change (%) of viscosity |  | −5.6 | 5.7 | 5.9 | 9.1 |
|  | Ranking of rate of change of viscosity |  | Good | Good | Good | Good |
|  | Ranking of storage stability |  | Good | Good | Good | Good |
| Rubbing fastness (cotton fabric) | Dry rubbing fastness |  | Excellent | Excellent | Excellent | Excellent |
|  | Wet rubbing fastness |  | Excellent | Excellent | Excellent | Excellent |
| Color developability in cotton fabric |  |  | Good | Good | Good | Good |
| Filtration properties after heating |  |  | Excellent | Excellent | Excellent | Excellent |
| Test of continuous printing properties |  |  | Excellent | |Excellent | |Excellent | |Excellent |

TABLE 4-1

|  |  |  | Comparative Example 1 | Comparative Example 2 | Comparative Example 3 |
|---|---|---|---|---|---|
|  |  | Aqueous pigment dispersion (Q) | Q'-1 | Q'-2 | Q'-3 |
|  |  | Ink (R) | R'-1 | R'-2 | R'-3 |
|  |  | Dry coating film (U) of aqueous pigment dispersion | U'-1 | U'-2 | U'-3 |
| Materials for aqueous pigment dispersion charged (parts by weight) | Pigment | Cyan pigment BASF Heliogen Blue D 7088 | 10 | 10 | 10 |
|  |  | Magenta pigment BASF Cinquasia_Magenta_D_4550J | — | — | — |
|  |  | Yellow pigment BASF Palitol Yellow D 1115J | — | — | — |
|  |  | Black pigment Orion Engineered Carbons NIPEX_160IQ | — | — | — |
|  |  | White pigment Sakai Chemical Industry Co., Ltd. R21 | — | — | — |
|  | Solvent solution or dispersion of urethane resin (P) | (P-1) | — | 30 | — |
|  |  | (P-2) | — | — | — |
|  |  | (P-3) | — | — | — |
|  |  | (P-4) | — | — | — |
|  |  | (P-5) | — | — | — |
|  |  | (P-6) | — | — | — |
|  |  | (P-7) | — | — | — |
|  |  | (P-8) | — | — | — |
|  |  | (P-9) | 30 | — | — |
|  |  | (P-10) | — | — | 30 |
|  |  | (P-11) | — | — | — |

TABLE 4-1-continued

|  |  |  | Comparative Example 1 | Comparative Example 2 | Comparative Example 3 |
|---|---|---|---|---|---|
|  |  | (P'-1) | — | — | — |
|  |  | (P'-2) | — | — | — |
|  | Solvent | Tetrahydrofuran | 27 | 27 | 27 |
|  | Neutralizer | Triethylamine | 0.54 | 0.54 | 0.63 |
|  |  | KOH 30 wt % water | — | — | — |
|  | Chain | Isophoronediamine | 0.64 | — | — |
|  | extender | Diethylenetriamine | — | — | 1.6 |
|  | Nonionic | (O-1) | — | — | — |
|  | surfactant | (O-2) | — | — | — |
|  |  | (O-3) | — | — | — |
|  |  | (O-4) | — | — | — |
|  |  | (O-5) | — | — | — |
|  |  | (O-6) | — | — | — |
|  |  | Water | 80 | 80 | 80 |
| Physical properties of aqueous pigment dispersion | Cumulant average particle size (nm) | | 196 | 175 | 151 |
|  | Molecular weight (Mw) of resin | | 120900 | 21400 | Unmeasurable |
|  | Storage modulus G' (MPa) at 160° C. | | 15.6 | 0.5 | 17.9 |
| Initial dispersibility of ink | Cumulant average particle size (nm) | | 192 | 179 | 155 |
|  | Ranking of particle size | | Poor | Good | Good |
|  | Viscosity (mPa · s) | | 4.5 | 5.1 | 5.5 |
|  | Ranking of viscosity | | Good | Good | Good |
|  | Ranking of initial dispersibility | | Poor | Good | Good |
| Storage stability of ink after stored at 60° C. 5 days | Rate of change (%) of particle size | | −1.6 | 1.7 | 6.5 |
|  | Ranking of rate of change of particle size | | Good | Good | Good |
|  | Rate of change (%) of viscosity | | 4.4 | 11.8 | 5.5 |
|  | Ranking of rate of change of viscosity | | Good | Poor | Good |
|  | Ranking of storage stability | | Good | Poor | Good |
| Rubbing fastness (cotton fabric) | Dry rubbing fastness | | Good | Average | Poor |
|  | Wet rubbing fastness | | Good | Poor | Poor |
| Color developability in cotton fabric | | | Poor | Good | Poor |
| Filtration properties after heating | | | Good | Poor | Good |
| Test of continuous printing properties | | | Good | Poor | Poor |

TABLE 4-2

|  |  |  | Comparative Example 4 | Comparative Example 5 | Comparative Example 6 |
|---|---|---|---|---|---|
|  |  | Aqueous pigment dispersion (Q) | Q'-4 | Q'-5 | Q'-6 |
|  |  | Ink (R) | R'-4 | R'-5 | R'-6 |
|  |  | Dry coating film (U) of aqueous pigment dispersion | U'-4 | U'-5 | U'-6 |
| Materials for aqueous pigment dispersion charged (parts by weight) | Pigment | Cyan pigment BASF Heliogen Blue D 7088 | 10 | 10 | 15 |
|  |  | Magenta pigment BASF Cinquasia_Magenta_D_4550J | — | — | — |
|  |  | Yellow pigment BASF Palitol Yellow D 1115J | — | — | — |
|  |  | Black pigment Orion Engineered Carbons NIPEX_160IQ | — | — | — |
|  |  | White pigment Sakai Chemical Industry Co., Ltd. R21 | — | — | — |
|  | Solvent solution or dispersion of urethane resin (P) | (P-1) | — | — | — |
|  |  | (P-2) | — | — | — |
|  |  | (P-3) | — | — | — |
|  |  | (P-4) | — | — | — |
|  |  | (P-5) | — | — | — |
|  |  | (P-6) | — | — | — |
|  |  | (P-7) | — | — | — |
|  |  | (P-8) | — | — | — |
|  |  | (P-9) | — | — | — |
|  |  | (P-10) | — | — | — |
|  |  | (P-11) | 30 | — | — |
|  |  | (P'-1) | — | 30 | — |
|  |  | (P'-2) | — | — | 19.6 |
|  | Solvent | Tetrahydrofuran | 27 | 27 | — |
|  | Neutralizer | Triethylamine | — | 0.41 | — |
|  |  | KOH 30 wt % water | — | — | — |
|  | Chain extender | Isophoronediamine | — | — | — |
|  |  | Diethylenetriamine | 1.93 | 0.7 | — |
|  | Nonionic surfactant | (O-1) | — | — | — |
|  |  | (O-2) | — | — | — |
|  |  | (O-3 | — | — | — |

TABLE 4-2-continued

|  |  | Comparative Example 4 | Comparative Example 5 | Comparative Example 6 |
|---|---|---|---|---|
|  | (O-4) | — | — | — |
|  | (O-5) | — | — | — |
|  | (O-6) | — | — | — |
|  | Water | 80 | 80 | 65.4 |
| Physical properties of aqueous pigment dispersion | Cumulant average particle size (nm) | 166 | 180 | 150 |
|  | Molecular weight (Mw) of resin | Unmeasurable | Unmeasurable | 45600 |
|  | Storage modulus G' (MPa) at 160° C. | 18.7 | 15.4 | 1.2 |
| Initial dispersibility of ink | Cumulant average particle size (nm) | 178 | 189 | 160 |
|  | Ranking of particle size | Good | Poor | Good |
|  | Viscosity (mPa · s) | 5.1 | 5.8 | 5.5 |
|  | Ranking of viscosity | Good | Good | Good |
|  | Ranking of initial dispersibility | Good | Poor | Good |
| Storage stability of ink after stored at 60° C. 5 days | Rate of change (%) of particle size | 11.2 | 1.1 | 2.5 |
|  | Ranking of rate of change of particle size | Poor | Good | Good |
|  | Rate of change (%) of viscosity | 11.8 | −6.9 | −10.9 |
|  | Ranking of rate of change of viscosity | Poor | Good | Poor |
|  | Ranking of storage stability | Poor | Good | Poor |
| Rubbing fastness (cotton fabric) | Dry rubbing fastness | Good | Good | Good |
|  | Wet rubbing fastness | Good | Good | Average |
| Color developability in cotton fabric |  | Poor | Poor | Good |
| Filtration properties after heating |  | Poor | Poor | Poor |
| Test of continuous printing properties |  | Good | Average | Average |

[Evaluation Methods]

Hereinafter, methods of measuring and evaluating the resulting aqueous pigment dispersions will be described.

<Method of Measuring Particle Size>

For the aqueous pigment dispersions (Q-1) to (Q-26) and (Q'-1) to (Q'-6) prepared in Examples 1 to 26 and Comparative Examples 1 to 6, the particle size was measured with a light scattering particle size distribution analyzer ["ELSZ-1000" available from Otsuka Electronics Co., Ltd.], and the obtained cumulant average particle size was defined as the particle size.

<Method of Preparing Dry Coating Film>

For the aqueous pigment dispersions (Q-1) to (Q-26) and (Q'-1) to (Q'-6) prepared in Examples 1 to 26 and Comparative Examples 1 to 6, 8.5 g of each aqueous pigment dispersion was poured into a Dispotray DT-2 (available from AS ONE Corporation), and the solution surface was uniformly levelled, followed by drying at 50° C. for 12 hours to prepare dry coating films (U-1) to (U-26) and (U'-1) to (U'-6) of the aqueous pigment dispersions.

<Method of Measuring Molecular Weight of Resin>

For the dry coating films (U-1) to (U-26) and (U'-1) to (U'-6) of the aqueous pigment dispersions, the molecular weight (weight average molecular weight) of the resin therein was measured by the following method.

apparatus: "Waters Alliance 2695" [available from TA Instruments-Waters Corporation LLC]
columns: one "Guardcolumn Super H-L" (one column), "one TSKgel SuperH2000, one TSKgel SuperH3000, and one TSKgel SuperH4000 (all available from Tosoh Corporation) columns connected"
sample solution: 0.25% by weight tetrahydrofuran solution
amount of solution injected: 10 μl
flow rate: 0.6 ml/min
temperature for measurement: 40° C.
detecting apparatus: refractive index detector
standard substance: polystyrene In measurement of the molecular weight, a sample was dissolved in tetrahydrofuran such that the content was 0.25% by weight, and insolubles were separated through a membrane filter "Omnipore Membrane filter (hydrophilic PTFE) JGWP02500 (pore diameter: 0.2 μm) available from Merck KGaA" to obtain a sample solution.

<Method of Measuring Storage Modulus G'>

For the dry coating films (U-1) to (U-26) and (U'-1) to (U'-6) of the aqueous pigment dispersions, the storage modulus G' was measured using the following rheometer.

apparatus: MCR92 (available from Anton Paar GmbH)
geometries: 8 mm parallel plate
frequency: 11 Hz
distortion rate: 0.5%
heating rate: 5° C./min
temperature at the start of increasing the temperature: 20° C.
temperature at the end of increasing the temperature: 160° C.

The sample for measurement was cut into a size of 1 cm×1 cm.

<Preparation of Ink>

For the aqueous pigment dispersions (Q-1) to (Q-26) and (Q'-1) to (Q'-6) prepared in Examples 1 to 26 and Comparative Examples 1 to 6, 50.0 parts of each aqueous pigment dispersion, 15.0 parts of glycerol, 1.0 part of triethylene glycol butyl ether (BTG), 0.5 parts of OLFINE E1010 (available from Nissin Chemical Industry Co., Ltd.), and 33.5 parts of water were homogenously mixed, and insolubles were removed through a filter. Thus, inks (R-1) to (R-26) for evaluation and Comparative inks (R'-1) to (R'-6) were prepared.

<Evaluation of Initial Dispersibility of Ink>

For each of the inks prepared above, the initial dispersibility of the ink was evaluated from the results of measurement of the particle size of the aqueous pigment dispersion in the ink and the ink viscosity.

The particle size of the aqueous pigment dispersion in the ink containing a color pigment (cyan, magenta, yellow, or black pigment in Examples and Comparative Example) was evaluated according to the following criteria:

Good: a cumulant average particle size of 180 nm or less
Poor: a cumulant average particle size of more than 180 nm The particle size of the aqueous pigment dispersion in the ink containing a white pigment was evaluated according to the following criteria:

Good: a cumulant average particle size of 300 nm or less
Poor: a cumulant average particle size of more than 300 nm The ink viscosity was evaluated according to the following criteria:
Good: an ink viscosity of 6.0 mPa·s or less
Poor: an ink viscosity of more than 6.0 mPa·s From the results of measurement of the particle size and the viscosity, the initial dispersibility of the ink was evaluated according to the following criteria:
Good: The cumulant average particle size and the ink viscosity both are good.
Poor: One or both of the cumulant average particle size and the ink viscosity are poor.

<Method of Measuring the Particle Size of Aqueous Pigment Dispersion in Ink>

It was measured by the same method as that for the aqueous pigment dispersion.

<Method of Measuring Ink Viscosity>

For the inks (R-1) to (R-26) for evaluation and Comparative inks (R'-6), the viscosity was measured on the following conditions using the following apparatus:
apparatus: MCR102 (available from Anton Paar GmbH)
geometries: 75 mm cone plate
shear rate: 1000 l/s
temperature for measurement: 20° C.

<Evaluation of Storage Stability of Ink>

The ink was left to stand for 5 days in an air-circulating dryer at a temperature set to 60° C., and storage stability of the ink was evaluated from a rate of change of the particle size of the aqueous pigment dispersion in the ink before and after the test and that of the ink viscosity before and after the test.

The rate of changes are calculated from the following expressions:
rate of change (%) of particle size of aqueous pigment dispersion in ink: (S2−S1)/S1×100
rate of change (%) of ink viscosity: (V2−V1)/V1×100
S1: particle size of aqueous pigment dispersion in ink before test
S2: particle size of aqueous pigment dispersion in ink after test
V1: ink viscosity before test
V2: ink viscosity after test Evaluation was performed according to the following criteria for evaluation.
Good: The rate of change of the particle size and that of the ink viscosity both are ±10% or less.
Poor: One or both of the rate of change of the particle size and that of the ink viscosity are more than +10% or less than −10%.

<Method of Evaluating Dry Rubbing Fastness (Rub Resistance) in Cotton Fabric: Color Ink>

The inks for evaluation (R-1) to (R-13), (R-15) to (R-23), (R-25), and (R-26) and Comparative inks (R'-1) to (R'-6) were printed on a plain cotton broadcloth [cotton: 100% by mass] using a modified machine of an inkjet printer PX-G930 available from Seiko Epson Corporation, and were dried at 160° C. for 10 minutes to prepare test pieces (21 cm×28 cm) of the plain cotton broadcloth having a pigment and the polyurethane resin applied thereonto. The dry rubbing fastness was evaluated according to JIS L0849-2. Each of the test pieces was rubbed 100 times in a reciprocating manner under a load of 200 g. The density of the transferred ink in the #3 shirting was measured in nine points of the test piece with a spectrocolorimeter [X-rite938 available from X-Rite, Inc.], and the average of the results of measurement was defined as the density of the transferred ink. The density of the transferred ink was evaluated according to the following criteria, and the results are shown in Tables 2-1 to 2-3, 3-1 to 3-3 and 4-1 to 4-2. A lower density of the transferred ink indicates higher dry rubbing fastness.
Excellent: a density of the transferred ink of 0.10 or less
Good: a density of the transferred ink of more than 0.10 and 0.15 or less
Average: a density of the transferred ink of more than 0.15 and 0.20 or less
Poor: a density of the transferred ink of more than 0.20 and 0.30 or less The density of the transferred ink of 0.15 or less indicates that the ink is at a practical level.

<Method of Evaluating Dry Rubbing Fastness (Rub Resistance) in Cotton Fabric: White Ink>

The inks for evaluation (R-14) and (R-24) were printed on a black plain cotton broadcloth [black cotton: 100% by mass] with a modified machine of an inkjet printer PX-G930 available from Seiko Epson Corporation, and were dried at 160° C. for 10 minutes to prepare test pieces (21 cm×28 cm) of the black plain cotton broadcloth having the pigment and the polyurethane resin applied thereonto.

The dry rubbing fastness was evaluated according to JIS L0849-2. Each of the test pieces was rubbed 100 times in a reciprocating manner under a load of 200 g. The pigment-printed surface of the test piece before and after rubbing was measured in nine points of the test piece with a spectrocolorimeter [X-rite938 available from X-Rite, Inc.], and the average of differences between the results of measurement before and after rubbing was defined as ΔL*. The ΔL* was evaluated according to the following criteria, and the results are shown in Tables 2-3 and 3-3. A lower ΔL* indicates higher rubbing fastness.
Excellent: ΔL*≤0.3
Good: 0.3<ΔL*≤1.0
Average: 1.0<ΔL*≤5.0
Poor: 5.0<ΔL*

<Method of Evaluating Wet Rubbing Fastness (Rub Resistance) in Cotton Fabric: Color Ink>

The inks for evaluation (R-1) to (R-13), (R-15) to (R-23), (R-25), and (R-26) and Comparative inks (R'-1) to (R'-6) were printed on a plain cotton broadcloth [cotton: 100% by mass] with a modified machine of an inkjet printer PX-G930 available from Seiko Epson Corporation, and were dried at 160° C. for 10 minutes to prepare test pieces (21 cm×28 cm) of the plain cotton broadcloth having the pigment and the polyurethane resin applied thereonto. The wet rubbing fastness was evaluated according to JIS L0849-2. Each of the test pieces was rubbed 100 times in a reciprocating manner under a load of 200 g. The density of the transferred ink in the #3 shirting was measured in nine points of the test piece with a spectrocolorimeter [X-rite938 available from X-Rite, Inc.], and the average of the results of measurement was defined as the density of the transferred ink. The density of the transferred ink was evaluated according to the following criteria, and the results are shown in Tables 2-1 to 2-3, 3-1 to 3-3 and 4-1 to 4-2. A lower density of the transferred ink indicates higher wet rubbing fastness.
Excellent: a density of the transferred ink of 0.20 or less
Good: a density of the transferred ink of more than 0.20 and 0.25 or less
Average: a density of the transferred ink of more than 0.25 and 0.30 or less
Poor: a density of the transferred ink of more than 0.30 and 0.40 or less A density of the transferred ink of 0.25 or less indicates that the ink is at a practical level.

<Method of Evaluating Wet Rubbing Fastness (Rub Resistance) in Cotton Fabric: White Ink>

The inks for evaluation (R-14) and (R-24) were printed on a black plain cotton broadcloth [black cotton: 100% by mass] with a modified machine of an inkjet printer PX-G930 available from Seiko Epson Corporation, and were dried at 160° C. for 10 minutes to prepare test pieces (21 cm×28 cm) of the black plain cotton broadcloth having the pigment and the polyurethane resin applied thereonto. The wet rubbing fastness was evaluated according to JIS L0849-2. Each of the test pieces was rubbed 100 times in a reciprocating manner under a load of 200 g. The pigment-printed surface of the test piece before and after rubbing was measured in nine points of the test piece with a spectrocolorimeter [X-rite938 available from X-Rite, Inc.], and the average of differences between the results of measurement before and after rubbing was defined as ΔL*. The ΔL* was evaluated according to the following criteria, and the results are shown in Tables 2-3 and 3-3. A lower ΔL* indicates higher rubbing fastness.

Excellent: ΔL*≤0.3
Good: 0.3<ΔL*≤1.0
Average: 1.0<ΔL*≤5.0
Poor: 5.0<ΔL*

<Method of Evaluating Color Developability in Cotton Fabric: Color Ink>

The inks for evaluation (R-1) to (R-13), (R-15) to (R-23), (R-25), and (R-26) and Comparative inks (R'-1) to (R'-6) were printed on a plain cotton broadcloth [cotton: 100% by mass] with a modified machine of an inkjet printer PX-G930 available from Seiko Epson Corporation, and were dried at 160° C. for 10 minutes to prepare test pieces (21 cm×28 cm) of the plain cotton broadcloth having the pigment and the polyurethane resin applied thereonto. The image density was measured in nine points of each test piece with a spectrocolorimeter [X-rite938 available from X-Rite, Inc.], and the average of the results of measurement was defined as an image density. The image density was evaluated according to the following criteria, and the results are shown in Tables 2-1 to 2-3, 3-1 to 3-3 and 4-1 to 4-2. A higher image density indicates higher color developability.

Good: an image density of 1.3 or more
Average: an image density of 1.2 or more and less than 1.3
Poor: an image density of less than 1.2

An image density of 1.3 or more indicates that the ink is at a practical level.

<Method of Evaluating Color Developability in Cotton Fabric: White Ink>

The inks for evaluation (R-14) and (R-24) were printed on a black plain cotton broadcloth [black cotton: 100% by mass] with a modified machine of an inkjet printer PX-G930 available from Seiko Epson Corporation, and were dried at 160° C. for 10 minutes to prepare test pieces (21 cm×28 cm) of the black plain cotton broadcloth having the pigment and the polyurethane resin applied thereonto.

The image density was determined based on the L* value, and the L* was measured in nine points of each test piece with a spectrocolorimeter [X-rite938 available from X-Rite, Inc.], and the average of the results of measurement was used. The L* was evaluated according to the following criteria, and the results are shown in Tables 2-3 and 3-3. A higher L* indicates higher color developability.

Good: an L* of 70 or more
Average: an L* of 50 or more and less than 70
Poor: an L* of less than 50

<Filtration Properties After Heating>

For the filtration properties after heating, an ink was left to stand for 5 days in a circulating dryer at a temperature set to 60° C., the ink was suctioned using a water flow aspirator (maximum degree of vacuum: about 24 mmHg) to filter the ink under reduced pressure.

The filters have a prefilter (φ47 mm, 100 sheets, AP2504700/2-3055-07) and an MF-Millipore membrane (cellulose-mixed ester, hydrophilicity, 8.0 μmt, ο47 mm, white). The filtration properties were evaluated as a weight of the ink which can be passed.

The criteria for evaluation are shown as below. The results are shown in Tables 2-1 to 2-3, 3-1 to 3-3 and 4-1 to 4-2.

Excellent: 300 g or more
Good: 100 g or more and less than 300 g
Average: 50 g or more and less than 100 g
Poor: less than 50 g <Test of Continuous Printing Properties>

The inks prepared above were each mounted on a modified machine of an inkjet printer PX-G930 available from Seiko Epson Corporation. A solid image was continuously printed with a resolution of 1440*720 dpi to evaluate uneven streaks. The criteria for evaluation are as shown below. The results are shown in Tables 2-1 to 2-3, 3-1 to 3-3 and 4-1 to 4-2.

Excellent: Uneven streaks do not occur for 24 hours or more.
Good: Uneven streaks occur in 5 hours or more and less than 24 hours.
Average: Uneven streaks occur in 1 hour or more and less than 5 hours.
Poor: Uneven streaks occur in less than 1 hour.

The inks for evaluation (R-1) to (R-26) had high initial dispersibility, high storage stability, and high rub resistance. These demonstrated high color developability in cotton fabrics. In Comparative ink (R'-3), the dry coating film of the aqueous pigment dispersion had a storage modulus G' of more than 10 MPa, and had insufficient rubbing fastness (Comparative Example 3). Comparative ink (R'-6), which contained the polyurethane resin prepared using polyester polyol, had insufficient storage stability (Comparative Example 6).

In Comparative inks (R'-1) and (R'-3) to (R'-5), the dry coating films of the aqueous pigment dispersions had a storage modulus G' of more than 10 MPa, and had insufficient color developability (Comparative Examples 1 and 3 to 5). In Comparative ink (R'-2), the dry coating film of the aqueous pigment dispersion had a storage modulus G' of less than 1 MPa, and had insufficient rubbing fastness (Comparative Example 2).

The aqueous pigment dispersion according to the present invention has high washing fastness and high rubbing fastness in printing on cotton fabrics, and therefore is useful as an aqueous pigment dispersion for preparing an inkjet ink composition for printing on cotton fabrics.

The invention claimed is:

1. An aqueous pigment dispersion for an aqueous inkjet ink, comprising a pigment and an aqueous medium, the pigment being dispersed with a polyurethane resin prepared by reacting an active hydrogen atom-containing component (A) with an organic polyisocyanate component (B), the active hydrogen atom-containing component (A) containing a polycarbonate polyol (a1), the organic polyisocyanate component (B) containing at least one compounds selected from the group consisting of aliphatic polyisocyanates (b1), alicyclic polyisocyanates (b2), and aromatic polyisocyanates (b3), wherein a coating film formed by drying the aqueous pigment dispersion at 50° C. for 12 hours has a storage modulus G' at 160° C. of 1 to 10 MPa.

2. The aqueous pigment dispersion according to claim 1, wherein the polycarbonate polyol (a1) is a crystalline polycarbonate polyol.

3. The aqueous pigment dispersion according to claim 1, wherein the polyurethane resin has an acid value of 10 to 40 mgKOH/g.

4. The aqueous pigment dispersion according to claim 1, wherein the polyurethane resin has a urethane content of is 1.1 to 2.3 mol/kg.

* * * * *